United States Patent
Takagi et al.

(10) Patent No.: US 12,118,815 B2
(45) Date of Patent: Oct. 15, 2024

(54) INFORMATION PROCESSING DEVICE, ASSOCIATING METHOD, AND ASSOCIATING PROGRAM

(71) Applicant: Nippon Telegraph and Telephone Corporation, Tokyo (JP)

(72) Inventors: Ikuko Takagi, Musashino (JP); Shiro Ogasawara, Musashino (JP); Koji Tsuji, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 539 days.

(21) Appl. No.: 17/433,718

(22) PCT Filed: Feb. 13, 2020

(86) PCT No.: PCT/JP2020/005631
§ 371 (c)(1),
(2) Date: Feb. 9, 2022

(87) PCT Pub. No.: WO2020/175163
PCT Pub. Date: Sep. 3, 2020

(65) Prior Publication Data
US 2022/0165077 A1 May 26, 2022

(30) Foreign Application Priority Data
Feb. 27, 2019 (JP) ................... 2019-034980

(51) Int. Cl.
*G06V 30/412* (2022.01)
*G06V 30/28* (2022.01)
*G06V 30/414* (2022.01)
*G06V 30/42* (2022.01)

(52) U.S. Cl.
CPC .......... *G06V 30/412* (2022.01); *G06V 30/287* (2022.01); *G06V 30/414* (2022.01); *G06V 30/42* (2022.01)

(58) Field of Classification Search
CPC .... G06V 30/412; G06V 30/416; G06V 30/42; G06V 30/414; G06F 40/174
See application file for complete search history.

(56) References Cited

U.S. PATENT DOCUMENTS

| | | | |
|---|---|---|---|
| 2012/0062961 A1* | 3/2012 | Yamaai | G06F 40/174 358/448 |
| 2012/0237131 A1* | 9/2012 | Ito | G06V 30/1448 382/229 |
| 2017/0177557 A1 | 6/2017 | Maltz et al. | |
| 2020/0311413 A1* | 10/2020 | Zhang | G06F 18/24 |
| 2022/0366312 A1* | 11/2022 | Gao | G06N 20/00 |

FOREIGN PATENT DOCUMENTS

| | | |
|---|---|---|
| JP | 2018010489 | 1/2018 |
| WO | WO 2019026147 | 2/2019 |

* cited by examiner

*Primary Examiner* — Margaret G Mastrodonato
(74) *Attorney, Agent, or Firm* — Fish & Richardson P.C.

(57) ABSTRACT

An information processing apparatus includes processing circuitry configured to register a set of item names corresponding to an item name field associated with an item value field in a predetermined business form, and identify an association of an item name field with an item value field included in a business form to be processed based on the set of item names registered.

7 Claims, 27 Drawing Sheets

| FIELD ID | CHARACTER STRING | TYPE OF CHARACTER | CONSTITUTING REGION OF FIELD |
|---|---|---|---|
| 1 | Kihonjouhou | CHINESE CHARACTER | ... |
| 2 | KeiyakuID | CHINESE CHARACTER, ALPHABET | ... |
| 3 | 12345678 | NUMBER | ... |
| 4 | Keiyakusyameigi | CHINESE CHARACTER | ... |
| 5 | Furigana | KATAKANA CHARACTER | ... |
| 6 | Dendentarou | KATAKANA CHARACTER | ... |
| 7 | Shimei | CHINESE CHARACTER | ... |
| 8 | Dendentarou | CHINESE CHARACTER | ... |
| 9 | Moushikomi-jouhou | CHINESE CHARACTER | ... |
| 10 | Kokyakutaipu | CHINESE CHARACTER, KATAKANA CHARACTER | ... |
| 11 | Shinki | CHINESE CHARACTER | ... |

Fig. 4

| FIELD ID | TYPE |
|---|---|
| 1 | TRUE |
| 2 | TRUE |
| 3 | FALSE |
| 4 | TRUE |
| 5 | TRUE |
| 6 | FALSE |
| 7 | TRUE |
| 8 | FALSE |
| 9 | TRUE |
| 10 | TRUE |
| 11 | FALSE |

| ITEM NAME FIELD ID | ITEM VALUE FIELD ID | REFERENCE | RELATIVE ARRANGEMENT PATTERN ID |
|---|---|---|---|
| 1 | 3 | ITEM NAME | 8 |
| 1 | 3 | ITEM VALUE | 548 |
| 2 | 3 | ITEM NAME | 8 |
| 2 | 3 | ITEM VALUE | 544 |
| 4 | 3 | ITEM NAME | 64 |
| 4 | 3 | ITEM VALUE | 516 |
| 5 | 3 | ITEM NAME | 192 |
| 5 | 3 | ITEM VALUE | 514 |
| 7 | 3 | ITEM NAME | 192 |
| 7 | 3 | ITEM VALUE | 514 |
| 9 | 3 | ITEM NAME | 64 |
| 9 | 3 | ITEM VALUE | 516 |
| 10 | 3 | ITEM NAME | 64 |
| 10 | 3 | ITEM VALUE | 516 |
| 1 | 6 | ITEM NAME | 8 |
| 1 | 6 | ITEM VALUE | 804 |
| 2 | 6 | ITEM NAME | 1 |
| 2 | 6 | ITEM VALUE | 768 |

Fig. 7

| ID | REFERENCE | RELATIVE ARRANGEMENT PATTERN | ACCEPTABILITY |
|---|---|---|---|
| 0 | ITEM NAME | 000000000 | – |
| 1 | ITEM NAME | 000000001 | UNACCEPTABLE |
| 2 | ITEM NAME | 000000010 | ACCEPTABLE |
| 3 | ITEM NAME | 000000011 | ACCEPTABLE |
| 4 | ITEM NAME | 000000100 | UNACCEPTABLE |
| 5 | ITEM NAME | 000000101 | – |
| 6 | ITEM NAME | 000000110 | ACCEPTABLE |
| 7 | ITEM NAME | 000000111 | ACCEPTABLE |
| 8 | ITEM NAME | 000001000 | ACCEPTABLE |
| 9 | ITEM NAME | 000001001 | ACCEPTABLE |
| 10 | ITEM NAME | 000001010 | – |
| 11 | ITEM NAME | 000001011 | – |
| 12 | ITEM NAME | 000001100 | – |
| 13 | ITEM NAME | 000001101 | – |
| 14 | ITEM NAME | 000001110 | – |
| 15 | ITEM NAME | 000001111 | ACCEPTABLE |
| ... | ... | ... | ... |
| 511 | ITEM NAME | 111111111 | UNACCEPTABLE |
| 512 | ITEM VALUE | 000000000 | – |
| 513 | ITEM VALUE | 000000001 | UNACCEPTABLE |
| 514 | ITEM VALUE | 000000010 | UNACCEPTABLE |
| 515 | ITEM VALUE | 000000011 | UNACCEPTABLE |
| 516 | ITEM VALUE | 000000100 | UNACCEPTABLE |
| 517 | ITEM VALUE | 000000101 | – |
| 518 | ITEM VALUE | 000000110 | UNACCEPTABLE |
| 519 | ITEM VALUE | 000000111 | UNACCEPTABLE |
| ... | ... | ... | ... |
| 544 | ITEM NAME | 000100000 | ACCEPTABLE |
| 545 | ITEM NAME | 000100001 | – |
| 546 | ITEM VALUE | 000100010 | – |
| 547 | ITEM VALUE | 000100011 | – |
| 548 | ITEM VALUE | 000100100 | ACCEPTABLE |
| 549 | ITEM VALUE | 000100101 | – |
| 550 | ITEM VALUE | 000100110 | ACCEPTABLE |
| 551 | ITEM VALUE | 000100111 | ACCEPTABLE |

Fig. 8

| ITEM NAME FIELD ID | ITEM VALUE FIELD ID | ACCEPTABILITY |
|---|---|---|
| 1 | 3 | 1 |
| 2 | 3 | 1 |
| 4 | 3 | 0 |
| 5 | 3 | 0 |
| 7 | 3 | 0 |
| 9 | 3 | 0 |
| 10 | 3 | 0 |
| 1 | 6 | 1 |
| 2 | 6 | 0 |
| | | |

Fig. 9

<SETS AND ELEMENTS>

$N_f$: SET OF ITEM NAME FIELDS, $n = |N_f|$: TOTAL NUMBER OF ITEM NAME FIELD SETS, $v_f$: ITEM NAME FIELD (ELEMENT OF $N_f$)

$N_v$: SET OF ITEM VALUE FIELDS (STRICTLY, THERE IS POSSIBILITY THAT ITEM NAME FIELD IS INCLUDED BECAUSE THIS IS SET OF FIELDS TYPES OF WHICH ARE NOT DETERMINED AS ITEM NAME)

$m = |N_v|$: TOTAL NUMBER OF ITEM VALUE FIELD SETS,      $v_f$: ITEM VALUE FIELD (ELEMENT OF $N_v$)

$S$: SET OF CHARACTER STRINGS (ITEM NAMES) INCLUDED IN ITEM NAME FIELD, $s$: CHARACTER STRING INCLUDED IN ITEM NAME FIELD (ELEMENT OF $S$)

$R$: SET OF ITEM NAME SETS,      $r$: ITEM NAME SET (ELEMENT OF $R$ AND $R'$)

$R'$: SET OF ITEM NAME SETS OF ESSENTIAL ITEMS TO BE PROCESSED $K$: SET OF ITEM NAME FIELD SETS,      $k$: ITEM NAME FIELD SET (ELEMENT OF $K$ AND $K_r$)

$K_r$: SET OF ITEM NAME FIELD SETS FOR ITEM NAME SET $r$ ($K_r \subseteq K$)

<CONSTANT>

$a_{ij} = \begin{cases} 1: \text{THERE IS POSSIBILITY THAT ITEM NAME FIELD } i \text{ IS ASSOCIATED WITH ITEM VALUE FIELD } j, \\ 0: \text{THERE IS NO POSSIBILITY THAT ITEM NAME FIELD } i \text{ IS ASSOCIATED WITH ITEM VALUE FIELD } j. \end{cases}$ $c_{ij}$: EVALUATION VALUE FOR ASSOCIATION OF ITEM NAME FIELD $i$ WITH ITEM VALUE FIELD $j$ $u_{si}$: WHETHER CHARACTER STRING IS EQUAL TO CHARACTER STRING $s$ OF ITEM NAME FIELD $i$ (0/1).

$p_{ki} = \begin{cases} 1: \text{ITEM NAME FIELD } i \text{ IS ELEMENT OF ITEM NAME FIELD SET } k, \\ 0: \text{ITEM NAME FIELD } i \text{ IS NOT ELEMENT OF ITEM NAME FIELD SET } k. \end{cases}$

<VARIABLE>

$x_{ij} = \begin{cases} 1: \text{ITEM NAME FIELD } i \text{ IS ASSOCIATED WITH ITEM VALUE FIELD } j, \\ 0: \text{ITEM NAME FIELD } i \text{ IS NOT ASSOCIATED WITH ITEM VALUE FIELD } j. \end{cases}$    $z_{kj} = \begin{cases} 1: \text{ITEM NAME FIELD SET } k \text{ IS ASSOCIATED WITH ITEM VALUE FIELD } j, \\ 0: \text{ITEM NAME FIELD SET } k \text{ IS NOT ASSOCIATED WITH ITEM VALUE FIELD } j. \end{cases}$

Fig. 14

$$\text{s.t.} \sum_{v_i \in N_I} x_{ij} \geq 1 \quad (v_j \in N_V) \quad \cdots (1)$$

(1) EACH ITEM VALUE FIELD IS ASSOCIATED WITH AT LEAST ONE ITEM NAME FIELD.

$$x_{ij} \leq a_{ij} \quad (v_i \in N_I, v_j \in N_V) \quad \cdots (2)$$

(2) ITEM NAME FIELD AND ITEM VALUE FIELD ARE ASSOCIATED ONLY IN CASE IN WHICH ASSOCIATION IS OF ACCEPTABLE RELATIVE ARRANGEMENT PATTERN.

$$\sum_{v_i \in N_I} u_{si} x_{ij} \leq 1 \quad (s \in S, v_j \in N_V) \quad \cdots (3)$$

(3) WHEN THERE ARE PLURALITY OF ITEM NAME FIELDS WITH IDENTICAL CHARACTER STRING, MAXIMUM NUMBER OF ITEM NAME FIELDS ASSOCIATED WITH IDENTICAL ITEM VALUE FIELD IS ONE.

$$\sum_{s \in S} \{\sum_{v_i \in N_I} u_{si}(x_{ij} - x_{il})\}^2 > 0 \quad (v_j, v_l \in \{N_V | j \neq l\}) \quad \cdots (4)$$

(4) ITEM VALUE FIELDS HAVE DIFFERENT SETS OF ITEM NAMES DESCRIBED IN ITEM NAME FIELDS ASSOCIATED WITH ITEM VALUE FIELDS.

$$\text{s.t.} \quad \sum_{k \in K} z_{kj} \leq 1 \quad (v_j \in N_V)$$ ···(1) EACH ITEM VALUE FIELD IS ASSOCIATED WITH UP TO ONE ITEM NAME FIELD SET.

$$\sum_{k \in K_r} \sum_{v_j \in N_V} z_{kj} \leq 1 \quad (r \in R)$$ ···(2) EACH ITEM NAME FIELD SET IS ASSOCIATED WITH UP TO ONE ITEM VALUE FIELD, AND FOR EACH ITEM NAME SET, MAXIMUM NUMBER OF ITEM NAME FIELD SETS GENERATED FROM IDENTICAL ITEM NAME SET ASSOCIATED WITH ITEM VALUE FIELD IS ONE.

$$\sum_{k \in K_r} \sum_{v_j \in N_V} z_{kj} = 1 \quad (r \in R^*)$$ ···(3) EACH ITEM NAME FIELD SET IS ASSOCIATED WITH UP TO ONE ITEM VALUE FIELD. IN CASE OF ESSENTIAL ITEMS TO BE PROCESSED, FOR EACH ITEM NAME SET, NUMBER OF ITEM NAME FIELD SETS GENERATED FROM IDENTICAL ITEM NAME SET ASSOCIATED WITH ITEM VALUE FIELD IS ONLY ONE $$x_{ij} \leq a_{ij} \quad (v_i \in N_I, v_j \in N_V)$$ ···(4) ITEM NAME FIELD AND ITEM VALUE FIELD ARE ASSOCIATED ONLY IN CASE IN WHICH ASSOCIATION IS OF ACCEPTABLE RELATIVE ARRANGEMENT PATTERN.

$$x_{ij} = \sum_{k \in K} p_{ik} z_{kj} \quad (v_i \in N_I, v_j \in N_V)$$ ···(5)

$$f(x) = \sum_{v_i \in N_I} \sum_{v_j \in N_V} c_{ij} \, x_{ij} \quad \cdots (1)$$

$$+\sigma \sum_{r \in R} (1 - \sum_{k \in K_r} \sum_{v_j \in N_V} z_{kj}) \quad \cdots (2)$$

σ: WEIGHT (ZERO OR HIGHER)

Fig. 18

| ITEM VALUE FIELD ID | ITEM NAME FIELD ID |
|---|---|
| 3 | 2 |
| 6 | 4 |
| 6 | 5 |
| 8 | 4 |
| 8 | 7 |
| 11 | 10 |

Fig. 20

INFORMATION PROCESSING DEVICE, ASSOCIATING METHOD, AND ASSOCIATING PROGRAM

CROSS-REFERENCE TO RELATED APPLICATIONS

This application is a National Stage application under 35 U.S.C. § 371 of International Application No. PCT/JP2020/005631, having an International Filing Date of Feb. 13, 2020, which claims priority to Japanese Application Serial No. 2019-034980, filed on Feb. 27, 2019. The disclosure of the prior application is considered part of the disclosure of this application, and is incorporated in its entirety into this application.

TECHNICAL FIELD

The present invention relates to an information processing apparatus, an association method, and an association program.

BACKGROUND ART

Electronic files or paper business forms are used in a variety of situations in business. Here, the term "business form" refers to an electronic file, a paper document, or a system screen containing a plurality of items with description of names of items (item names) and values of items (item values), and relationships of the items are expressed in an arrangement on a two-dimensional plane.

Such business forms often differ in style depending on organizations that define the styles of the business forms even though most of the description contents are identical. In addition, changes are often made in the course of business operations. In the related art, for example, there is a method, in which, in order to correctly identify a position of an item value written on a business form to be automatically processed and extract the data even if layouts are different due to differences in organizations that define the styles of business forms, an amendment during use, or the like, information for determining the type of a field (whether the description content in the field is of an item name or an item value) is provided in advance to determine whether the field is of an item name, and then the correspondence between the item name field and the item value field is recognized to identify the item value field corresponding to the specified item name to be automatically processed from the fields of the business form.

CITATION LIST

Patent Literature

Patent Literature 1: Japanese Laid-open Patent Publication No. 2018-10489

SUMMARY OF THE INVENTION

Technical Problem

However, techniques of the related art have a problem in that an association result may not be used when the arrangement of the fields is changed. For example, the related art has a problem in that an item value field is hard to identify in a case in which vertical and horizontal rows are swapped when item names are arranged in both vertical and horizontal directions, or when an order of master-slave relationships between a plurality of item names associated with an identical item value is changed.

Means for Solving the Problem

In order to solve the above-described problem and achieve an objective, an information processing apparatus of the present invention includes processing circuitry configured to register a set of item names corresponding to an item name field associated with an item value field in a predetermined business form, and identify an association of an item name field with an item value field included in a business form to be processed based on the set of item names registered.

Effects of the Invention

According to the present invention, even if there is a change in an arrangement of fields of a business form, the effect in which item name fields and item value fields included in the business form are associated to identify a desired item value field is exhibited.

BRIEF DESCRIPTION OF DRAWINGS

FIG. 4 is a diagram illustrating an example of description content/position data.

FIG. 5 is a diagram illustrating an example of field type data.

FIG. 6 is a diagram for describing a process of dividing a form.

FIG. 7 is a diagram illustrating an example of data of a relative arrangement pattern.

FIG. 8 is a diagram illustrating an example of acceptable/unacceptable relative arrangement patterns.

FIG. 9 is a diagram illustrating an example of association acceptance information.

FIG. 14 is a diagram for describing symbols used to express constraints and evaluation functions in mathematical formulas.

FIG. 15 is a diagram illustrating an example of constraints imposed when a style is registered.

FIG. 17 is a diagram illustrating constraints when a registered style is used.

FIG. 18 is a diagram illustrating an example of an evaluation function when a registered style is used.

FIG. 20 is a diagram illustrating association information of item name fields and item value fields.

FIG. 21($b$) is a flowchart illustrating the example of the overall process of the information processing apparatus according to the first embodiment.

DESCRIPTION OF EMBODIMENTS

Hereinafter, embodiments of an information processing apparatus, an association method, and an association program according to the present application will be described with reference to the drawings. Note that the embodiments do not limit the information processing apparatus, the association method, and the association program according to the present application.

First Embodiment In the following embodiment, a configuration of an information processing apparatus 10 according to a first embodiment, a logical configuration of a business form processing tool 16, and a procedure of the information processing apparatus 10 will be described in order, and finally effects of the first embodiment will be described.

Figure 1:
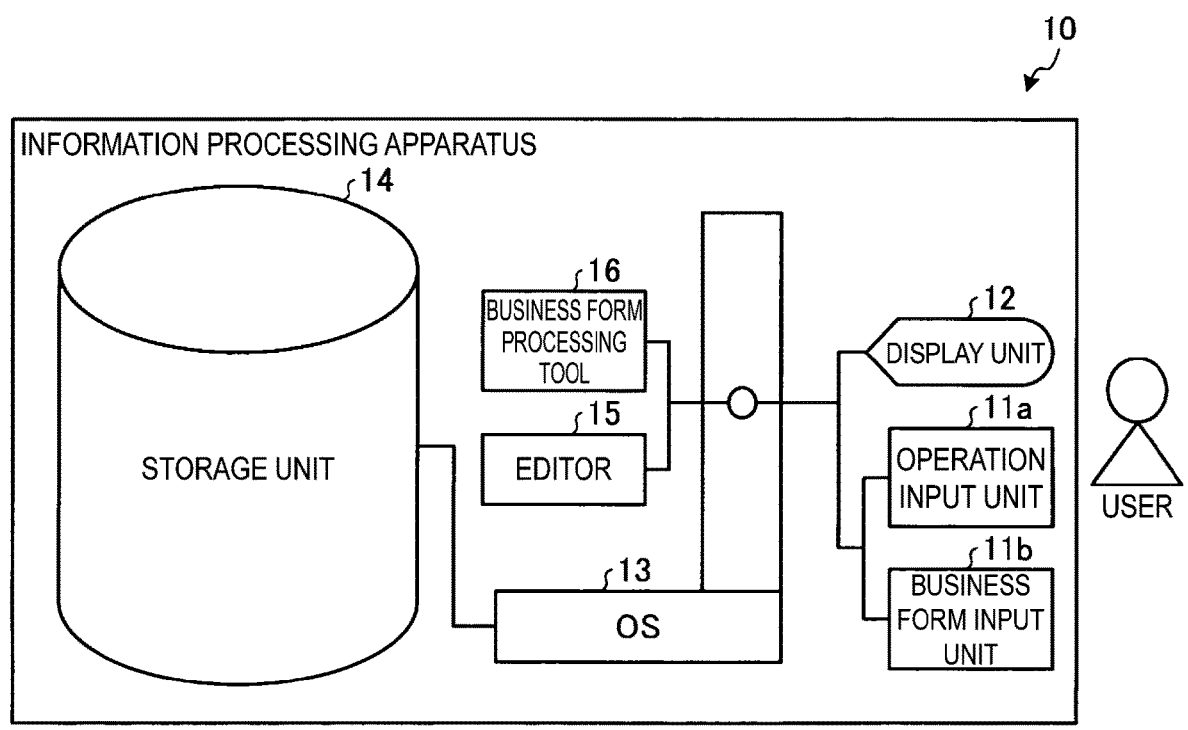
FIG. 1 is a block diagram illustrating a configuration example of an information processing apparatus according to a first embodiment.

Configuration of Information Processing Apparatus First, a configuration example of a system including the information processing apparatus 10 according to the present embodiment will be described using FIG. 1. FIG. 1 is a block diagram illustrating a configuration example of the information processing apparatus according to the first embodiment. Note that the configuration illustrated in FIG. 1 is merely an example, and a specific configuration is not particularly limited.

The information processing apparatus 10 is an apparatus such as a personal computer (PC) or a smartphone, for example, that mechanically processes description contents of business forms. Here, examples of business forms include electronic data created by an application, PDF files, structural data of system screens, and image data (e.g., image data obtained by converting an electronic file or a system screen, or electronic data obtained by scanning paper document).

In addition, the information processing apparatus 10 carries out a process of registering an acceptable relative arrangement pattern and an unacceptable relative arrangement pattern (hereinafter referred to as an "acceptable/unacceptable relative placement pattern") prior to mechanically processing description contents of a business form. The information processing apparatus 10 uses the registered acceptable/unacceptable relative arrangement pattern when the style of the business form is registered and registered style information is used to determine a possibility of an association of an item name field with an item value field included in the business form. Note that fields of the business form may not be rectangular, but may be simple polygons. In addition, the fields of the business form may be or may not be surrounded by ruled lines. Thus, when the fields are not surrounded by ruled lines, a rectangle acquired in object acquisition or the like may be regarded as a field.

Figure 3:
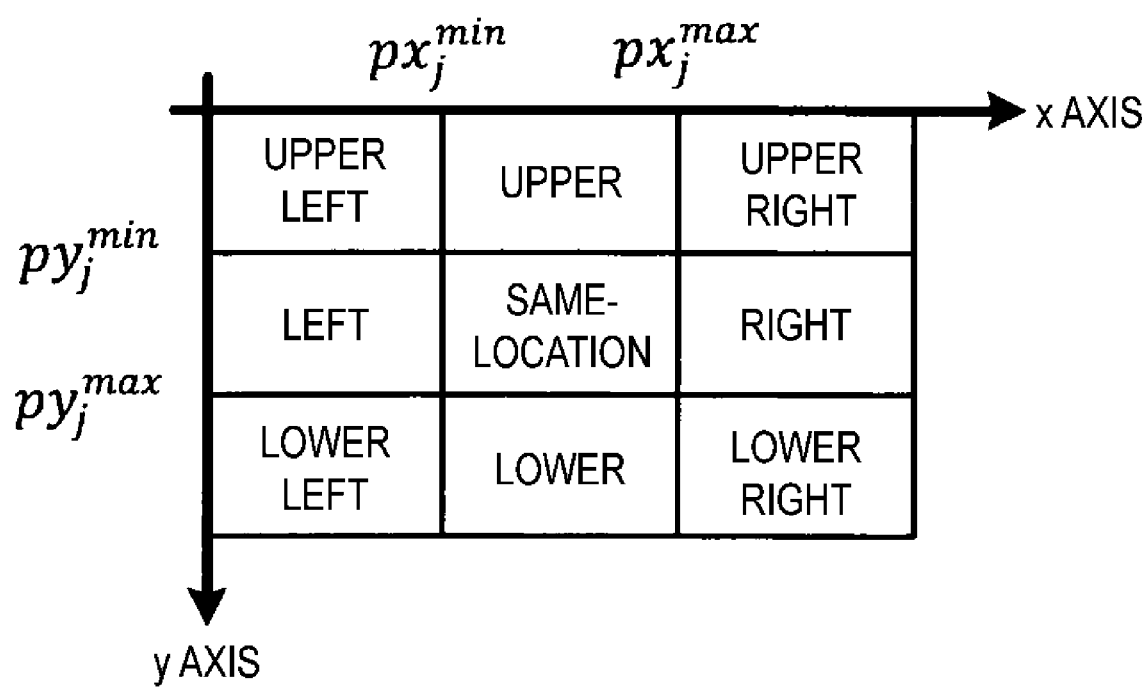
FIG. 3 is a diagram illustrating a relative arrangement pattern.

Here, a relative arrangement pattern will be described using FIG. 3. For example, a relative arrangement pattern of a field i with respect to a field j in a business form indicates which region the field i overlaps in a case in which a plane is divided into nine regions including upper left, upper, upper right, left, right, lower left, lower, lower right, and same-location regions centered on the smallest rectangle circumscribing the field j (hereinafter, these regions will be referred to as a "group of regions centered on a field j") as illustrated in FIG. 3. The number of regions to which the field i expands may be single or multiple. However, because the fields are simple polygons, when there are a plurality of regions to which the field i expands, the regions share at least one of the sides serving as the boundaries of the regions.

For an acceptable/unacceptable relative arrangement pattern, for example, if an item name field i is an item name field of an item value field j in a business form used in Japan, it is assumed that, among a group of regions centered on the item value field j, the item name field i overlaps at least either the left or upper region (regardless of whether the item name field i overlaps a region other than the left and upper regions) or overlaps only the same-location region. In other words, the item name field i overlapping only the regions (1) to (3) below does not serve as an item name field of the item value field j.

(1) The upper left region of the item value field j.
(2) The upper right, right, lower right, lower, or lower left region of the item value field j, or a region formed by combining some or all of the regions.
(3) A region formed by combining the regions (1) and (2) described above with the same-location region of the item value field j.

For the acceptable/unacceptable relative arrangement pattern, for example, if the item value field j is an item value field of the item name field i in a business form used in Japan, it is assumed that, among a group of regions centered on the item name field i, the item value field j overlaps at least either the right or lower region (regardless of whether the item name field j overlaps a region other than the right and lower regions) or overlaps only the same-location region. In other words, the item value field j overlapping only the regions (1) to (3) below does not serve as an item value field of the item name field i.

(1) The lower right region of the item name field i.
(2) The lower left, left, upper left, upper, or upper right region of the item name field i, or a region formed by combining the regions.
(3) A region formed by combining the regions (1) and (2) described above with the same-location region of the item value field i.

Although an acceptable relative arrangement pattern or an unacceptable arrangement pattern is specified here by being specifically listed, it may be specified using a logical formula expressing an acceptable condition that "a relative arrangement pattern is acceptable if the pattern overlaps at least either a ○○ region or a ×× region among the group of regions," an unacceptable condition, or the like.

The above is a "generic model" for any item name field and item value field. In a case in which a different assumption is required for an item name field with a particular item name and an item value field in a particular style, an acceptable or unacceptable relative arrangement pattern for the item name field and the item value field may be determined according to an "individual item name rule."

The information processing apparatus 10 includes an operation input unit 11a, a business form input unit 11b, a display unit 12, an operating system (OS) 13, a storage unit 14, an editor 15, and a business form processing tool 16. Note that the constituent components are not limited to being installed on the same apparatus, but may be disposed to be distributed among a plurality of apparatuses.

The operation input unit 11a receives an operation of a tool such as an execution instruction such as registration of a style of a business form, mechanical processing, and the like, and modification or editing of association information between an item name field and an item value field, and includes a keyboard, a mouse, a touch panel, and the like. The business form input unit 11b receives data of a business form or the like, and includes a camera, a scanner, or the like. In addition, the display unit 12 displays various processing results, and includes a display, a touch panel, a speaker, or the like.

In addition, the information processing apparatus 10 implements the OS 13 and activates the editor 15 that edits various parameters and the like associated with processing of the OS 13 and the business form processing tool 16 that processes business forms.

The storage unit 14 is a storage device, for example, a hard disk drive (HDD), a solid state drive (SSD), an optical disc, or the like. The storage unit 14 may be a data rewritable semiconductor memory such as a random access memory (RAM), a flash memory, or a non-volatile static random access memory (NVSRAM). The storage unit 14 stores, for example, determination information for a type of a field, which will be described below.

Figure 2:
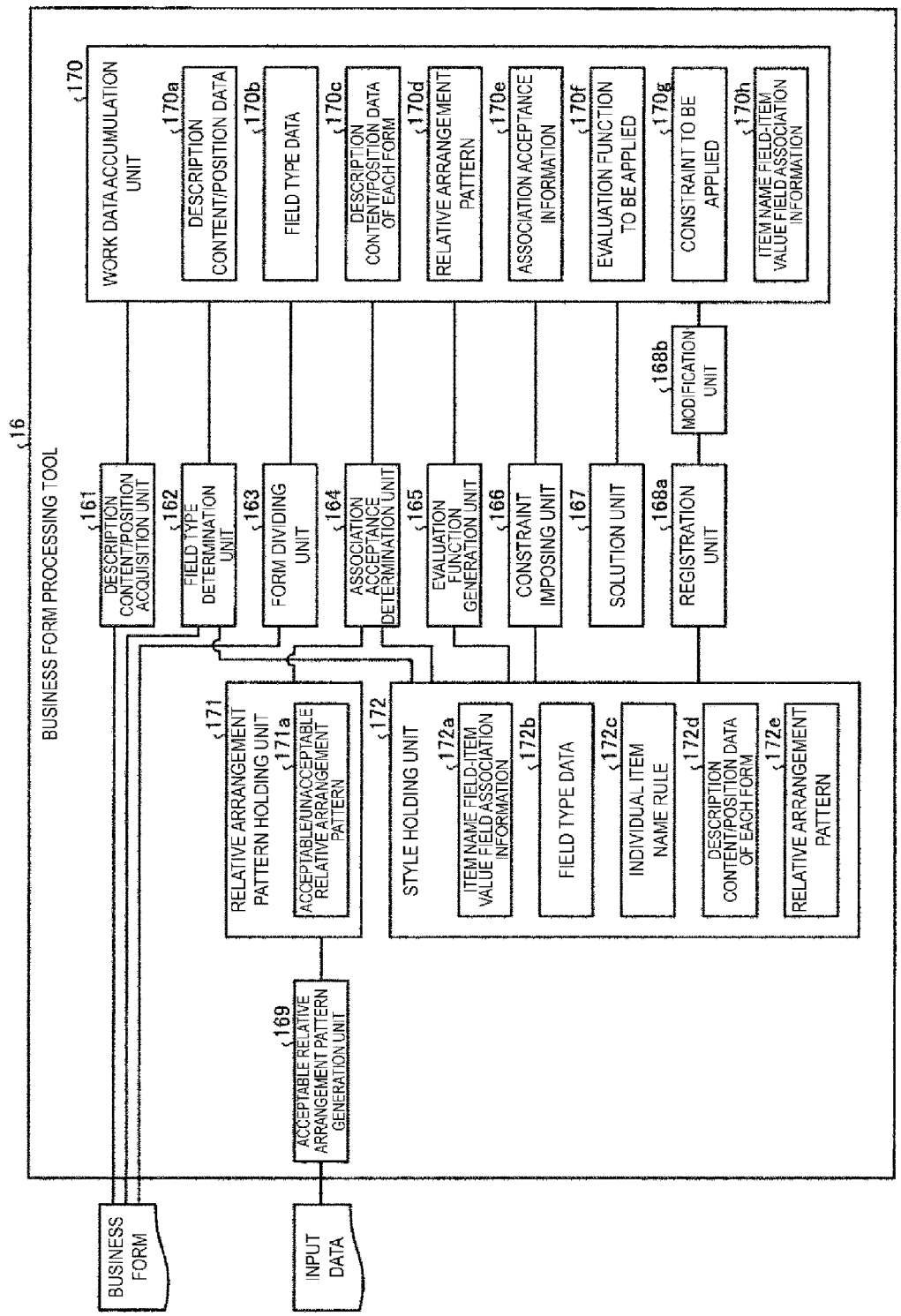
FIG. 2 is a block diagram illustrating a logical configuration of a business form processing tool of the information processing apparatus according to the first embodiment.

Next, a logical configuration of the business form processing tool 16 will be described using the example of FIG. 2. FIG. 2 is a block diagram illustrating a logical configuration of the business form processing tool of the information processing apparatus according to the first embodiment. As illustrated in FIG. 2, the business form processing tool 16 includes a description content/position acquisition unit 161, a field type determination unit 162, a form dividing unit 163, an association acceptance determination unit 164, an evaluation function generation unit 165, a constraint imposing unit 166, a solution unit 167, a registration unit 168a, a modification unit 168b, and an acceptable relative arrangement pattern generation unit 169.

The description content/position acquisition unit 161 receives data of a business form and acquires constituting regions of fields of the business form and character strings included in the fields. Then, the description content/position acquisition unit 161 stores, in a work data accumulation unit 170, description content/position data 170a indicating the acquired character strings of each field and constituting region of each field included in each business form. Here, the description content/position data 170a will be described using FIG. 4. As illustrated in FIG. 4, in the description content/position data 170a, a "field ID" for identifying the field, a "character string" included in the field, a "type of characters" constituting the character string, and a "constituting region of the field" are associated with each other. The constituting region of the field may be information related to, for example, contour lines of the field or a set of vertexes of the field, like vector data, or may be information indicating which cell the field includes when the entire business form is divided into cells arranged in a grid of rows and columns, like raster data.

The field type determination unit 162 determines the type of each field of the business form and stores the determination result in the work data accumulation unit 170 as field type data 170b. Note that a method for determining the type of each field of the business form may be any method. In addition, in the case of a known business form, the field type determination unit 162 may refer to preset information for determining the type of each field to determine the type of the field of the business form. In addition, for example, when acquiring a plurality of business forms with the same layout, comparing the description contents of fields at the same position in the business forms, and determining that the description contents of the fields at the same position in the business forms are the same, the field type determination unit 162 may determine the type of the fields as an item name, and in a case in which there are fields with different contents, the field type determination unit 162 may determine the type of the fields as an item value.

Here, the field type data 170b will be described using FIG. 5. As illustrated in FIG. 5, in the field type data 170b, an "ID" for identifying a field and a "type" indicating the type of the field are associated with each other. In the example of FIG. 5, the type "TRUE" means that the field is of an "item name," and the type "FALSE" means that the field is of an "item value."

Figure 6:
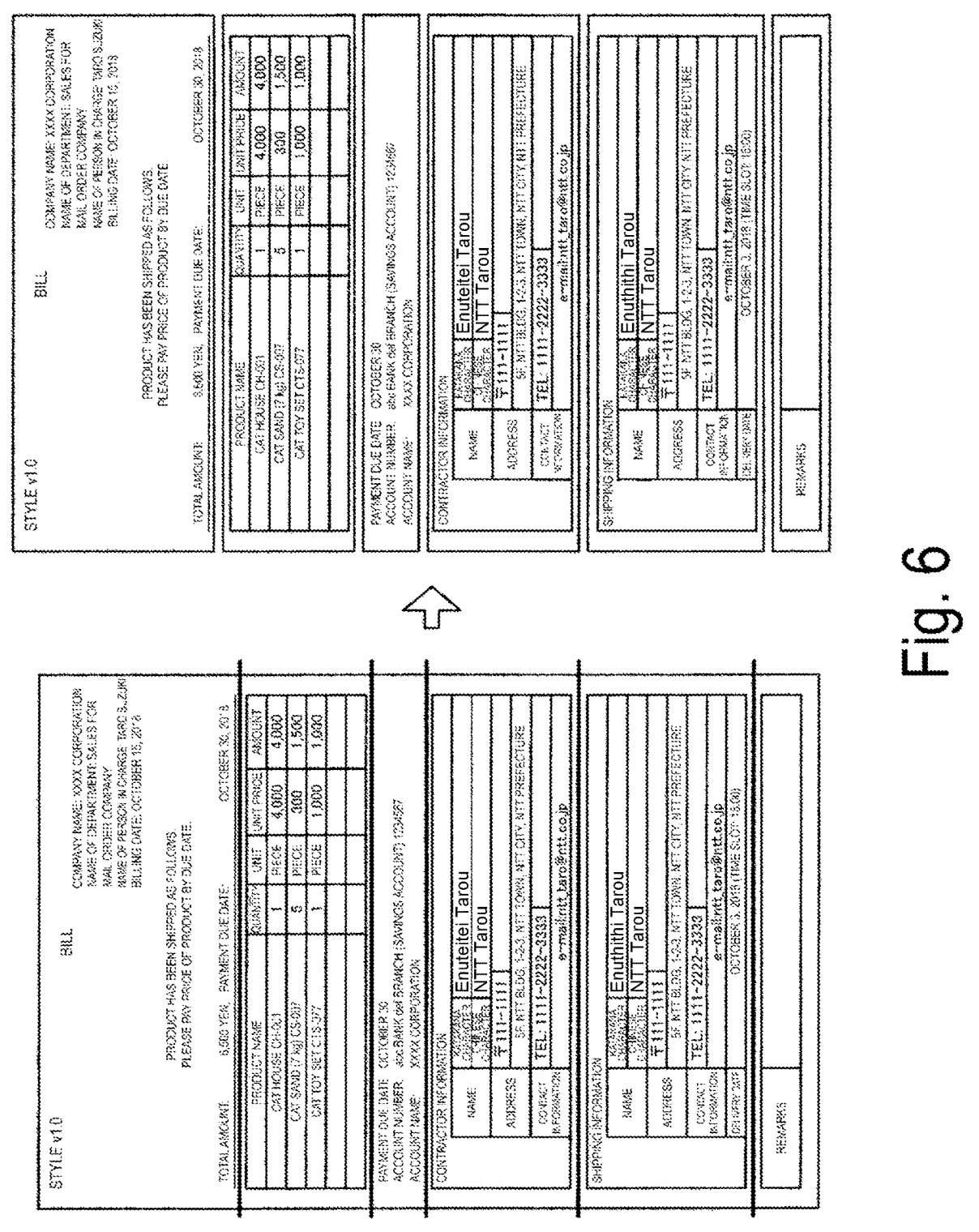

The form dividing unit 163 divides a form in order to increase efficiency in association of an item name field with an item value field. The form dividing unit 163 divides, for example, a form into a region surrounded by ruled lines and a region not surrounded by ruled lines and treats the forms in the regions as individual forms as illustrated in FIG. 6. Then, the form dividing unit 163 divides the data of the description content/position data 170a for each form and stores the data in the work data accumulation unit 170 as description content/position data of each form 170c. Note that the processing by the form dividing unit 163 may be omitted, and in a case in which a form is not divided, the entire business form is treated as a single form, and subsequent processing is performed. Hereinafter, unless stated otherwise, a fragment form obtained by dividing a business form and an entire business form which is not divided will be simply referred to as a "business form" and will not be distinguished.

The association acceptance determination unit 164 obtains a relative arrangement pattern, which is a distribution pattern of a region in which another field is present using each field in a business form to be processed as a reference, and compares the relative arrangement pattern to any one or both of preset "acceptable/unacceptable relative placement patterns" to determine whether there is a possibility of an association of the item name field with the item value field in the business form to be processed. That is, the association acceptance determination unit 164 determines whether there is a possibility of an association of the item name field with the item value field based on the "acceptable/unacceptable relative arrangement patterns."

Specifically, first, the association acceptance determination unit 164 obtains a relative arrangement pattern, which is a distribution pattern of a region in which another field is present using each field in the business form to be processed as a reference, and stores the relative arrangement pattern as a "relative arrangement pattern" 170*d* in the work data accumulation unit 170. Here, an example of data of the relative arrangement pattern will be described using the example of FIG. 7. As illustrated in FIG. 7, in the relative arrangement pattern, an "item name field ID" for identifying an item name, an "item value field ID" for identifying an item value, a "reference" indicating which of item name and item value is to be used as a reference, and a "relative arrangement pattern ID" for identifying a relative arrangement pattern are associated with each other.

Then, the association acceptance determination unit 164 refers to an acceptable/unacceptable relative arrangement pattern 171*a* stored in a relative arrangement pattern holding unit 171 and determines whether there is a possibility of an association of each item value field with each item name field based on whether the relative arrangement pattern of each field is acceptable. Specifically, the association acceptance determination unit 164 refers to the acceptable/unacceptable relative arrangement pattern 171*a* to determine, for each combination of an item name field and an item value field, whether a relative arrangement pattern of the item value field using the item name field as a reference is acceptable and whether a relative arrangement pattern of the item name field using the item value field as a reference is acceptable. If the relative arrangement pattern is acceptable for the combination when both of the item name field and the item value field are used as references, the association acceptance determination unit 164 determines that there is a possibility of an association of the item name field with the item value field, and if not, determines that there is no possibility of an association of the item name field with the item value field. Here, an example of data of the relative arrangement pattern will be described using the example of FIG. 8. In the acceptable/unacceptable relative arrangement pattern 171*a*, an "ID" indicating a relative arrangement pattern ID, a "reference" indicating which of an item name or an item value is to be used as reference, a "relative arrangement pattern" representing whether fields are arranged in each of the upper left, upper, upper right, left, same-location, right, lower left, lower, and lower right regions or not (1 or 0) in that order in binary, and "acceptability" indicating whether the pattern is acceptable.

To describe a specific example with the examples of FIG. 7 and FIG. 8, for example, because the relative arrangement pattern ID is "8" when the item name field ID is "1," the item value field ID is "3," and the reference is "item name" in the first row of the relative arrangement pattern exemplified in FIG. 7, the association acceptance determination unit 164 refers to the acceptability corresponding to the ID "8" of the acceptable/unacceptable relative arrangement pattern 171*a* in FIG. 8. In the example of FIG. 8, the acceptability corresponding to the ID "8" is "acceptable," and thus the association acceptance determination unit 164 determines that the pattern is acceptable. In addition, because the relative arrangement pattern ID is "548" when the item name field ID is "1," the item value field ID is "3," and the reference is "item value," the association acceptance determination unit 164 refers to the acceptability corresponding to the ID "548" of the acceptable/unacceptable relative arrangement pattern 171*a*. Here, because the acceptability corresponding to the ID "548" is also "acceptable," the association acceptance determination unit 164 determines that there is a possibility of an association of the item name field with the item name field ID "1" with the item value field with the item value field ID "3" and stores the determination result in the work data accumulation unit 170 as association acceptance information 170*e*. Here, because the acceptability corresponding to the ID "548" is "unacceptable," the association acceptance determination unit 164 determines that there is no possibility of an association of the item name field with the item name field ID "1" and the item value field with the item value field ID "3" and stores the determination result in the work data accumulation unit 170 as association acceptance information 170*e*.

Here, an example of data of the association acceptance information will be described using the example of FIG. 9. As illustrated in FIG. 9, in the association acceptance information 170*e*, a combination of an "item name field ID" with an "item value field ID" is associated with an "acceptability" indicating whether the combination is acceptable. If the acceptability of the association acceptance information 170*e* is "1," it means that there is a possibility that the combination of the corresponding "item name field ID" and "item value field ID" is associated. As in the example described above, when determining that there is a possibility that the item name field with the item name field ID "1" and the item value field with the item value field ID "3" are associated, the association acceptance determination unit 164 associates the item name field ID "1" and the item value field ID "3" with the acceptability "1" and stores the result in the work data accumulation unit 170 as association acceptance information.

In this manner, even if the shapes of the fields are not rectangular, the association acceptance determination unit 164 can comprehensively determine both the determination result of the relative arrangement using the item value field as a reference and the determination result of the relative arrangement using the item value name field as a reference to perform complementation, and thus can remove a possibility of the unnecessary correspondence, and reduce a possibility of wrongly associating the fields.

Figure 10:
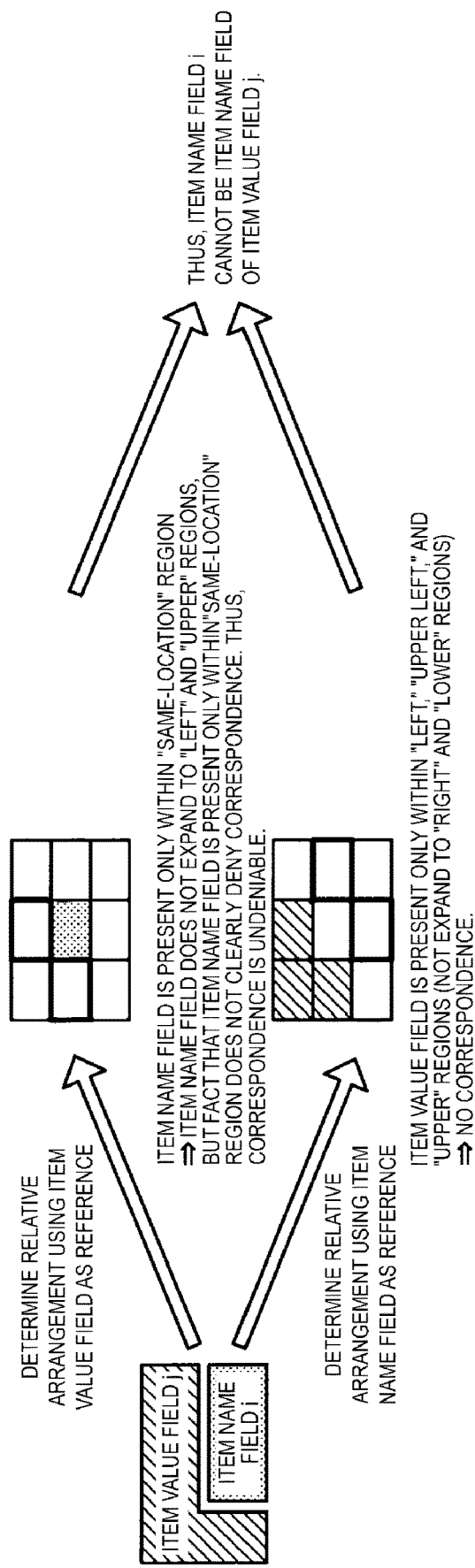
FIG. 10 is a diagram illustrating an example of processing of comprehensively determining both a determination result of a relative arrangement using an item value field as a reference and a determination result of a relative arrangement using an item name field as a reference.
Figure 11:
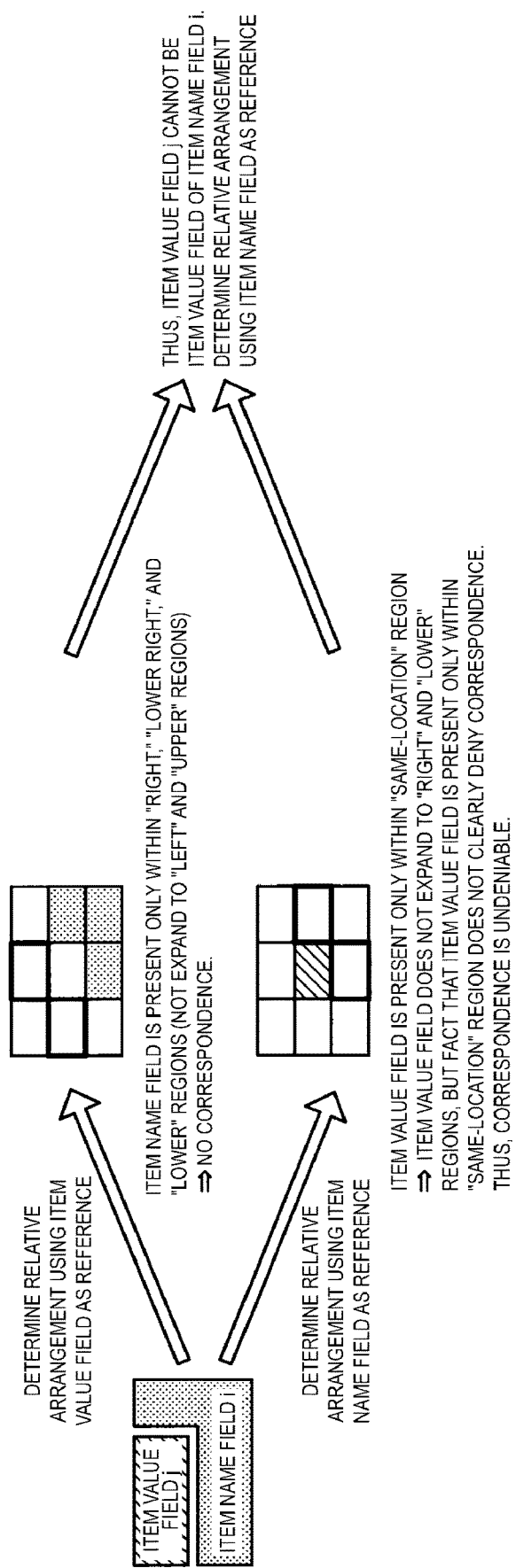
FIG. 11 is a diagram illustrating an example of processing of comprehensively determining both a determination result of a relative arrangement using an item value field as a reference and a determination result of a relative arrangement using an item name field as a reference.

Here, the processing of comprehensively determining both a determination result of a relative arrangement using an item value field as a reference and a determination result of a relative arrangement using an item name field as a reference will be described using FIGS. 10 and 11. FIGS. 10 and 11 are diagrams for describing an example of processing of comprehensively determining both a determination result of a relative arrangement using an item value field as a reference and a determination result of a relative arrangement using an item name field as a reference.

For example, as illustrated in FIG. 10, when an item value field j is used as a reference to determine a relative arrangement, an item name field i is present only within the "same-location" region. The item name field i does not expand to the "left" and "upper" regions, but the fact that the item name field i is present only within the "same-location" region does not clearly deny a correspondence. Thus, the association acceptance determination unit 164 determines that the correspondence is undeniable. On the other hand, when the item name field i is used as a reference to determine a relative arrangement, the item value field j is present only within the "left," "upper left," and "upper" regions. Thus, the association acceptance determination unit 164 determines that there is no correspondence. Thus, as a result of combining the determination results, the association acceptance determination unit 164 determines that the item name field i cannot be an item name field of the item value field j.

In addition, for example, when the item value field j is used as a reference to determine a relative arrangement, the item name field i is present only within the "right," "lower right," and "lower" regions as illustrated in FIG. 11. Thus, the association acceptance determination unit 164 determines that there is no correspondence. When the item name field i is used as a reference to determine a relative arrangement, the item value field j is present only within the "same-location" region. The item value field j does not expand to the "right" and "lower" regions, but the fact that the item value field j is present only within the "same-location" region does not clearly deny a correspondence. Thus, the association acceptance determination unit 164 determines that the correspondence is undeniable. Thus, as a result of combining the determination results, the association acceptance determination unit 164 determines that the item name field i cannot be an item name field of the item value field j.

Here, it is possible to obtain an acceptable/unacceptable relative arrangement pattern using a method different from the method of specifically listing the acceptable/unacceptable relative arrangement patterns described above and designating each of the patterns as acceptable/unacceptable. The method involves acquiring a relative arrangement pattern from association cases of item name fields and item value fields in a variety of styles and generating an acceptable arrangement pattern based on the aforementioned relative arrangement pattern. When an association (or non-association) of any item name field and item value field is known, for example, the acceptable relative arrangement pattern generation unit 169 generates an acceptable (or unacceptable) relative arrangement pattern based on any relative arrangement pattern of the item name field and the item value field.

The acceptable relative arrangement pattern generation unit 169 acquires the relative arrangement pattern from the association of the item name field with the item value field in a business form having a predetermined style and creates data of an acceptable relative arrangement pattern based on the acquired relative arrangement pattern. In other words, the acceptable relative arrangement pattern generation unit 169 generates an acceptable (or unacceptable) relative arrangement pattern using information regarding the association of the item name field with the item value field. Note that, in the association information of the item name field and the item value field, it is assumed that the manually associated result is given as input of the acceptable relative arrangement pattern generation unit.

Figure 12:
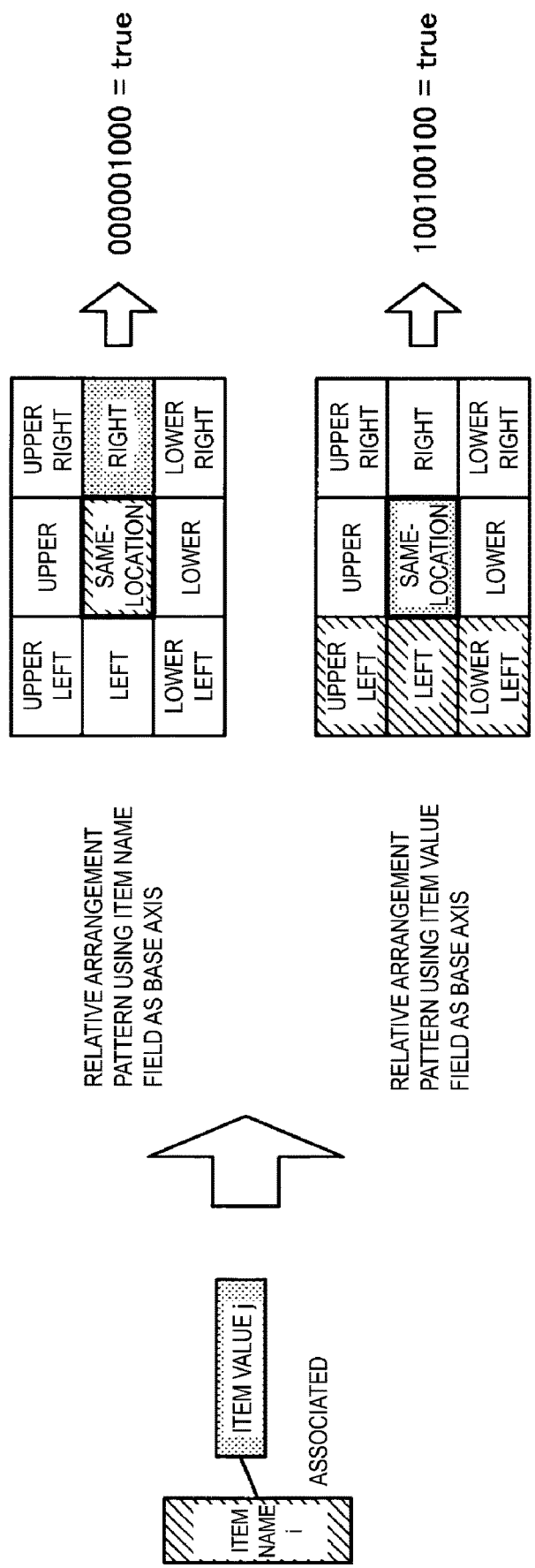
FIG. 12 is a diagram illustrating an example of processing of generating a relative arrangement pattern.
Figure 13:
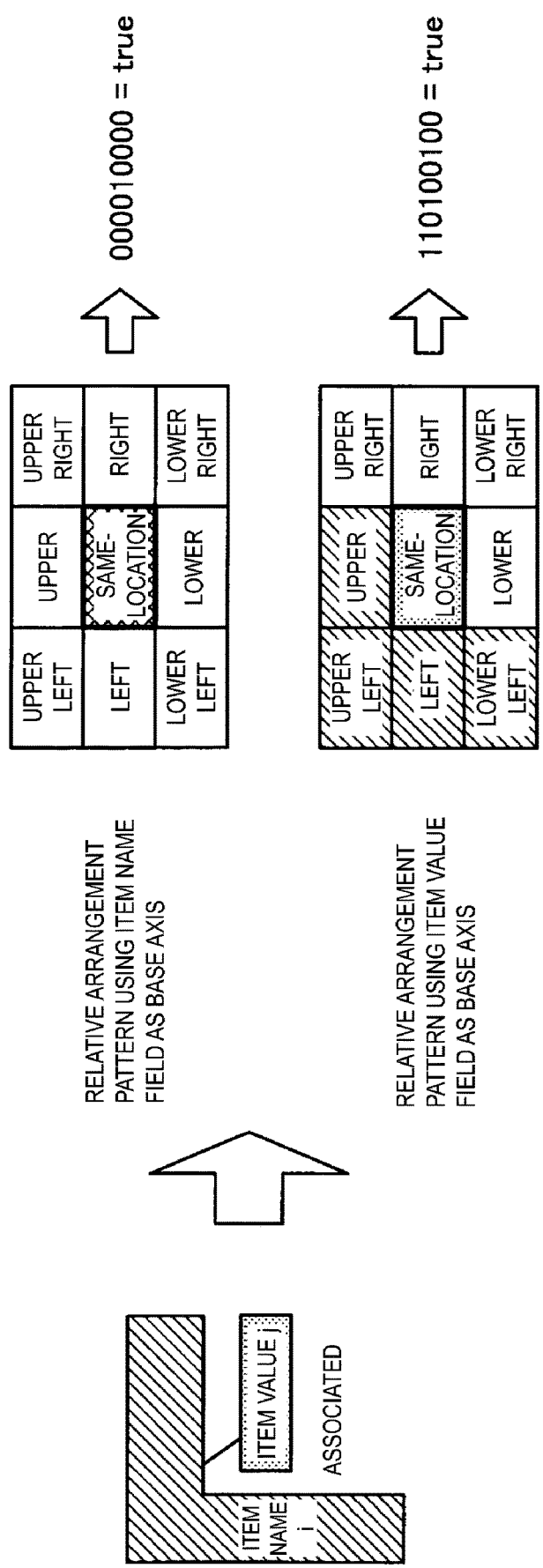
FIG. 13 is a diagram illustrating an example of processing of generating a relative arrangement pattern.

Here, a process of generating a relative arrangement pattern will be described using examples of FIGS. 12 and 13. FIGS. 12 and 13 are diagrams illustrating an example of processing of generating a relative arrangement pattern. For example, in a case in which an association of the item name field i with the item value field j is known, the acceptable relative arrangement pattern generation unit 169 generates, as an acceptable relative arrangement pattern, a relative arrangement pattern "000001000" using the item name field i as a reference as illustrated in FIG. 12 and stores the generated pattern in the relative arrangement pattern holding unit 171. In addition, the acceptable relative arrangement pattern generation unit 169 generates, as an acceptable relative arrangement pattern, a relative arrangement pattern "100100100" using the item value field j as a reference and stores the generated pattern in the relative arrangement pattern holding unit 171.

In addition, in a case in which an association of the item name field i with the item value field j is known, the acceptable relative arrangement pattern generation unit 169 generates, as an acceptable relative arrangement pattern, a relative arrangement pattern "000010000" using the item name field i as a reference as illustrated in FIG. 13 and stores the generated pattern in the relative arrangement pattern holding unit 171. In addition, the acceptable relative arrangement pattern generation unit 169 generates, as an acceptable relative arrangement pattern, a relative arrangement pattern "110100100" using the item value field j as a reference and stores the generated pattern in the relative arrangement pattern holding unit 171.

Moreover, the association acceptance determination unit 164 may determine as will be described below, when registered style information is used, i.e., when style information held in the style holding unit 172 is used to obtain an association of the item value field with the item name field included in a business form to be processed. In the determination, in a case in which an individual item name rule defining any one or both of a preset acceptable distribution pattern and unacceptable distribution pattern for each item name are set as style information, the association acceptance determination unit 164 determines whether there is a possibility of an association of an item name field with an item value field in the business form to be processed according to the individual item name rule. As the individual item name rule, for example, it is assumed that a rule that a field of an item name with a character string "contract ID" is associated with an item value field on the right side, a rule that a field of an item name with a character string "customer type" is not associated with an item value on the bottom side, or the like may be set.

The evaluation function generation unit 165 obtains a coefficient determined in accordance with the business form necessary for an evaluation function, generates an evaluation function, and stores the evaluation function as an evaluation function to be applied 170$f$ in the work data accumulation unit 170. The evaluation function includes, for each item value field, an evaluation item that reflects a perspective of evaluating a degree of an association of an item name field with the item value field. The evaluation function uses, as an evaluation item for determining an association of an item value field with an item name field, any or all of evaluation items such as proximity of the item value field and the item name field in an arrangement, a difference between the width and the height of the fields or a low proportion thereof, and a low level of association of the item value field with the item name field. Furthermore, when registered style information is used, the evaluation function generation unit 165 uses, in addition to these evaluation items, an evaluation item such as how many items that are present in the business form when the style is registered are also present in a business form to be processed.

For example, assuming that the business form is a medium that can help the description content of an item value to be understood from item name information, it is highly likely that the item name field is positioned as close as possible to the item value field from the perspective of readability. Therefore, it is possible to assume as a generic evaluation item that "a closer distance between an item name field and an item value field is more highly evaluated." In addition, an association of an item name field with an item value field is expressed by the size of the fields. When a width of the item name field is close to a width of the item value field, that is, when the field is projected in the vertical direction or the horizontal direction of the business form, and an overlapping range is large, it is highly likely that there is a high degree of an association. Therefore, it is possible to assume as a generic evaluation item that "an evaluation value is higher when the difference between a width of an item name field and a width of an item value field is smaller."

In addition, evaluation item values are prepared in advance for each relative arrangement pattern for a generic or acceptable relative arrangement pattern of an individual item name rule. The evaluation function generation unit 165 may apply such an evaluation item value to a combination of an item name field and an item value field of a business form whose association of the item name field with the item value field is unknown in accordance with the relative arrangement patterns and include the evaluation item value in an evaluation function. As the evaluation item values that are prepared in advance for each relative arrangement pattern, it is conceivable that, for example, a higher evaluation item value is set for a relative arrangement pattern with a larger number of association cases in a business form whose association of the item name field with the item value field is known.

In addition, when registered style information is used, an evaluation item regarding the degree of match of the type of characters of the item value field associated with the item name field, the characters being described in a relative arrangement pattern or the field, with characters in the business form when a style is registered may be included in the evaluation function.

Alternatively, a penalty evaluation item may be included when the constraints described below are not satisfied. For example, the evaluation item "evaluation is low if no item name field is allocated to an item value field" may be included in the evaluation function so that no such item value field remains to the extent possible while accepting the case in which the item value field is not associated with the item name field.

Alternatively, in a case in which there is a possibility that an item is added, that is, there is a possibility that it cannot be correctly determined whether a field is an item name field or an item value field when registered style information is used, the evaluation function generation unit 165 may include an evaluation item relating to the number of item value fields associated with each item name field and the degree of match of the fields in the business form when a style is registered in the evaluation function. Note that, in this case, the evaluation function generation unit 165 calculates the number of item value fields associated with each item name field in the business form when a style is registered from the style information held in the style holding unit 172.

The evaluation function generation unit 165 weighs any one or the plurality of evaluation item candidates described above with a weight specified in advance and generates an evaluation function for determining the association of the item value field with the item name field.

Here, symbols used to express evaluation functions and constraints in mathematical formulas will be described using the examples of FIG. 14. FIG. 14 is a diagram for describing symbols used to express evaluation functions and constraints in mathematical formulas. In FIG. 14, the definitions of the symbols for "set and element," "constant," "variable," and "evaluation function" are described.

Figure 16:
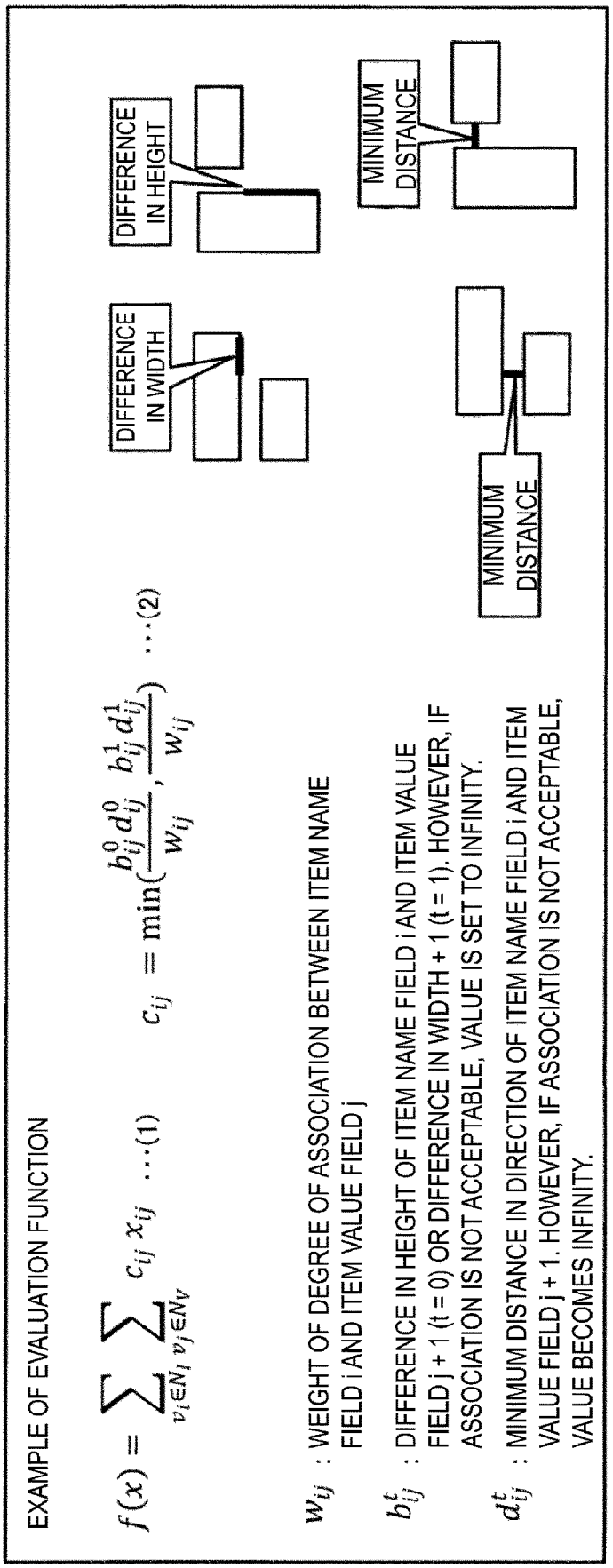
FIG. 16 is a diagram illustrating an example of an evaluation function when a style is registered.

In addition, an example of evaluation functions will now be described using the examples of FIGS. 16 and 18. FIG. 16 is a diagram illustrating an example of an evaluation function when a style is registered. In equation (1) of FIG. 16, the solution is found so that the sum of the evaluation values is smallest with $x_{ij}$ as a variable. Moreover, $c_{ij}$ is determined by equation (2) in FIG. 16.

FIG. 18 is a diagram illustrating an example of an evaluation function when registered style information is used. In FIG. 18, $c_{ij}$ in equation (1) is the same as that of FIG. 16. Equation (2) in FIG. 18 is a weighted evaluation item relating to a small number of item name sets that are not associated with any item value field included in the business form to be processed among item name sets included in the business form when a style is registered, which is determined from the style information, that is, the number of items present in the business form to be processed among items present in the business form when a style is registered.

The constraint imposing unit 166 imposes a predetermined constraint and stores the constraint as a constraint to be applied 170$g$ in the work data accumulation unit. For the constraint, a condition at least to be satisfied on the assumption of a combination of an item name field associated with each item value field is defined. Note that constraints differ when a style is registered and when registered style information is used. Note that the constraints described below are merely examples, and other constraints may be additionally imposed. For example, an additional constraint may be imposed on some items when an item name field and an item value field are associated or not associated with each other.

For example, the constraint imposing unit 166 imposes the four constraints to be described next when a style is registered in which an item name field and an item value field in a business form to be processed are distinguishable. The first constraint is that "an item name field and an item value field are associated only in a case of a relative arrangement pattern in which the association is acceptable." The second constraint is that "each item value field is associated with at least one item name field." The third constraint is that "when there are a plurality of item name fields with an identical character string, the maximum number of item name fields associated with an identical item value field is one." The fourth constraint is that "item value fields have different sets of item names described in item name fields associated with the item value fields."

In addition, for example, the constraint imposing unit 166 first performs the processing described below prior to imposing the constraints when the registered style information is used in which there is a possibility that a field whose type cannot be determined is included in item value fields of a business form to be processed. In this processing, the constraint imposing unit 166 obtains an item name set from the style information held in the style holding unit 172 for each item value field of the business form in the case in which the style is registered. Here, the item name set refers to a set of character strings in an item name field associated with each item value field. Next, the constraint imposing unit 166 selects, for each item name set, an item name field including a character string included in the item name set from among item name fields included in the business form to be processed and allocates the item name field to create an item name field set. Here, the item name field set is a set of item name fields. In this case, if the business form to be processed includes a plurality of item name fields with an identical character string, that is, an item name for which a plurality of allocation methods are possible, the constraint imposing unit 166 lists the item name field set, the number of which is the same as the number of allocation methods. In addition, the constraint imposing unit 166 imposes the four constraints to be described next. The first constraint is "an item name field and an item value field are associated only in a case of a relative arrangement pattern in which the association is acceptable." The second constraint is that "each item name field set is associated with up to one item value field." The third constraint is that "each item name field set is associated with up to one item value field." The fourth constraint is that "the maximum number of item name field sets generated for the same item name set to be associated with an item value field is one." In addition, in a case in which an essential item to be processed is specified among items included in the registered style information, the constraint imposing unit 166 further imposes, on each item name set of these items, the constraint that "the number of item name field sets generated from the same item name set to be associated with an item value field is only one."

In addition, the constraints are illustrated in FIGS. 15 and 17. FIG. 15 is a diagram illustrating an example of constraints imposed when a style is registered. As illustrated in FIG. 15, the four constraints described next are constraints imposed when a style is registered. The first constraint is that "each item value field is associated with at least one item name field" (see the relationship (1) of FIG. 15). The second constraint is that "an item name field and an item value field are associated only in a case of a relative arrangement pattern in which the association is acceptable" (see the relationship (2) of FIG. 15). The third constraint is that "when there are a plurality of item name fields with an identical character string, the maximum number of item name fields associated with an identical item value field is one" (see the relationship (3) of FIG. 15). The fourth constraint is that "item value fields have different sets of item names described in item name fields associated with the item value fields" (see the relationship (4) of FIG. 15).

In addition, in the present embodiment, when the registered style information is used, the presence or absence of the association of the item value field with the item name field set is used as an additional variable, and the four constraints described next are imposed as illustrated in FIG. 17. The first constraint is that "each item value field is associated with up to one item name field set" (see the relationship (1) of FIG. 17). The second constraint is that "each item name field set is associated with up to one item value field." The third constraint is that "for each item name set, the maximum number of item name field sets generated from an identical item name set to be associated with an item value field is one" (see the relationship (2) of FIG. 17). The fourth constraint is that "an item name field and an item value field are associated only in a case of a relative arrangement pattern in which the association is acceptable" (see the relationship (4) of FIG. 17) Furthermore, a relationship established between a variable representing whether there is an association of an item value field with an item name field and a variable representing whether there is an association of an item value field with an item name field set (see the relationship (5) of FIG. 17) is given as a constraint. In addition, in a case in which items of a business form when a style is registered include an essential item when registered style information is used, the constraint that "for each item name set, the number of item name field sets generated from an identical item name set associated with an item value field is only one" (see the relationship (3) of FIG. 17) is given as an additional constraint.

The solution unit 167 identifies the association of the item name field with the item value field included in the business form to be processed so that the constraints imposed by the constraint imposing unit are satisfied and the evaluation function generated by the evaluation function generation unit is optimized.

The solution unit 167, using the presence or absence of the association of the item name field with the item value field as a variable, strictly or approximately determines a combination of solutions that satisfies the constraints and minimizes the evaluation function, or expresses the problem as an approximate mathematical formula and solves this formula. Thus, the solution unit 167 obtains the association of the item name field with the item value field. The mathematical formula may be expressed as a more approximate mathematical formula in accordance with whether a solver is used, and a solver to be used as long as the assumed meaning of the constraint and the evaluation function is unchanged.

Figure 19:
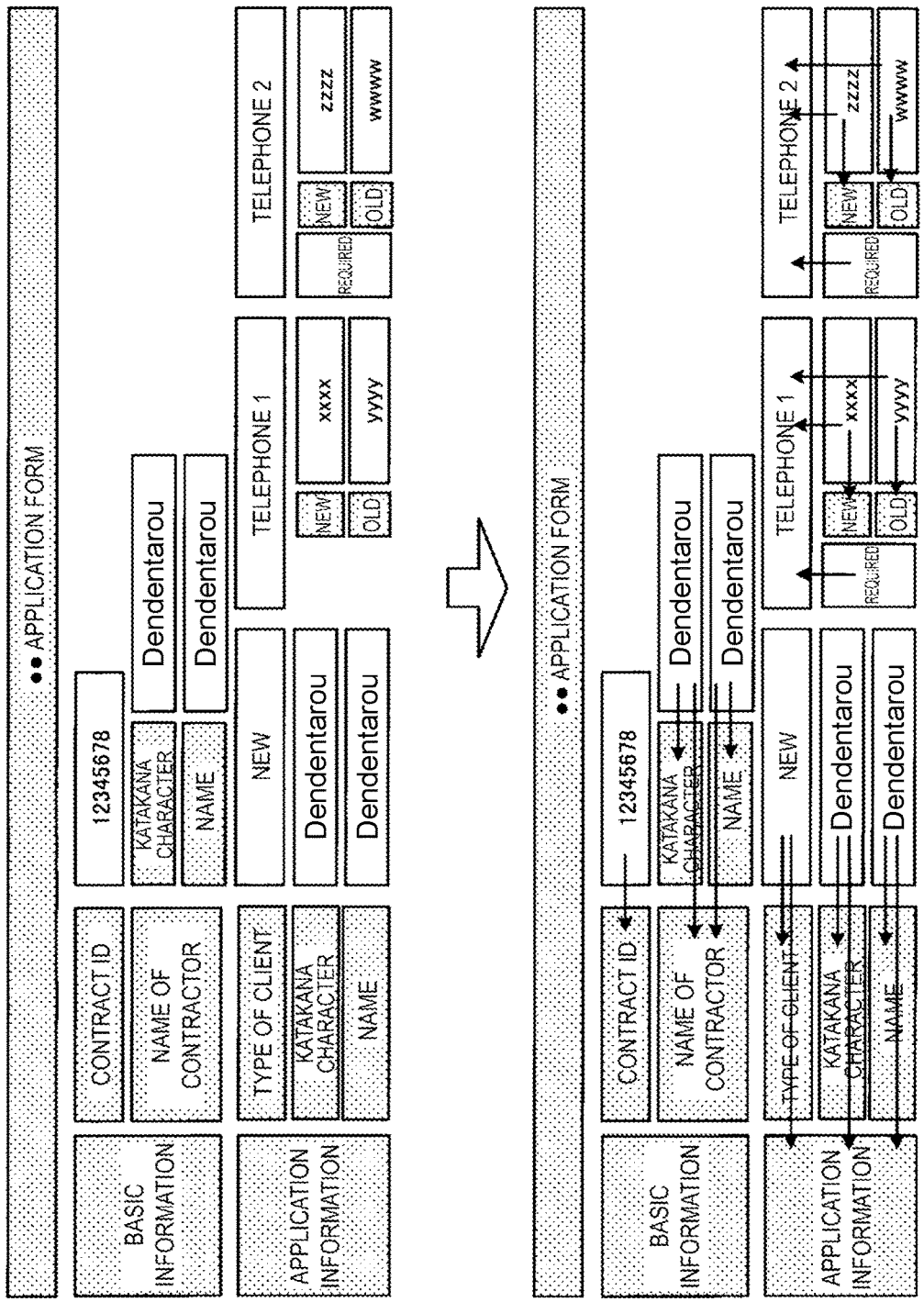
FIG. 19 is a diagram illustrating a solution example of the information processing apparatus according to the first embodiment.

The solution unit 167 identifies an association of an item name field with an item value field as illustrated in FIG. 19, for example. FIG. 19 is a diagram illustrating a solution example of the information processing apparatus according to the first embodiment. To give specific description with reference to the example of FIG. 19, for example, the solution unit 167 identifies the association of an item name field including a character string "contract ID" with an item value field including a character string "12345678." Then, the solution unit 167 stores item name field-item value field association information 170*h* in the work data accumulation unit 170.

In addition, for example, the solution unit 167 identifies that the association of the item name field including a character string "name of contractor" and the item name field including a character string "katakana character" with an item value field including a character string "デンデンタロウ" as illustrated in FIG. 19. Then, the solution unit 167 stores item name field-item value field association information 170*h* in the work data accumulation unit 170.

As illustrated in FIG. 20, in the item name field-item value field association information 170*h*, an "item value field ID" for identifying the item value field is associated with an "item name field ID" for identifying the item name fields. FIG. 20 is a diagram illustrating association information of item name fields and item value fields.

The modification unit 168*b* modifies the item name field-item value field association information 170*h* registered by the solution unit 167. For example, in response to a user instruction, the modification unit 168*b* modifies the item name field-item value field association information 170*h* stored in the work data accumulation unit 170. Alternatively, the modification unit 168*b* adds, changes, and deletes the individual item name rule in accordance with a user instruction.

The registration unit 168*a* registers, as style information, the result of determining the association of the item name field with the item value field of the business form to be processed when a style is registered and a part of data created in the course of the determination, held in the work data accumulation unit 170, in association with an identifier for identifying the style of the business form. Specifically, the registration unit 168*a* registers the field type data 170*b*, the description content/description position data of each form 170*c*, the relative arrangement pattern 170*d*, and the item name field-item value field association information 170*h* stored in the work data accumulation unit 170 as field type data 172*b*, description content/description position data of each form 172*d*, a relative arrangement pattern 172*e*, and item name field-item value field association information 172*a*, respectively, in the style holding unit 172. In addition, a set individual item name rule 172*c* is registered in the style holding unit 172.

Note that in the above description, the registration unit registers, as style information in the style holding unit 172, the field type data 170b, the description content/description position data of each form 170c, the relative arrangement pattern 170d, and the item name field-item value field association information 170h stored in the work data accumulation unit 170. Furthermore, when the registered style information is used, the registration unit determines an item name set for each of item value fields of the business form when a style is registered from the data registered in the style holding unit 172. However, the item name set may be determined by the registration unit when a style is registered and registered in the style holding unit 172 as part of the style information, and may be used when the registered style information is used.

Further, in the above description, the data obtained from processing by the description content/position acquisition unit, the field type determination unit, the form dividing unit, and the association acceptance determination unit, the data held by the relative arrangement pattern holding unit, and the data held by the style holding unit are processed by the functional units including the evaluation function generation unit, the constraint imposing unit, and the solution unit, and thus the association of an item name field with an item value field included in the business form to be processed is identified based on the item name set registered by the registration unit. The association of the item name field with the item value field included in the business form to be processed may be identified based on the item name set registered by the registration unit using a configuration in which the evaluation function generation unit, the constraint imposing unit, and the solution unit are integrated as a single "solution unit," or a method in which a constraint or an evaluation function is not explicitly used internally while the same data is input in the resultant "solution unit."

Figure 21A:
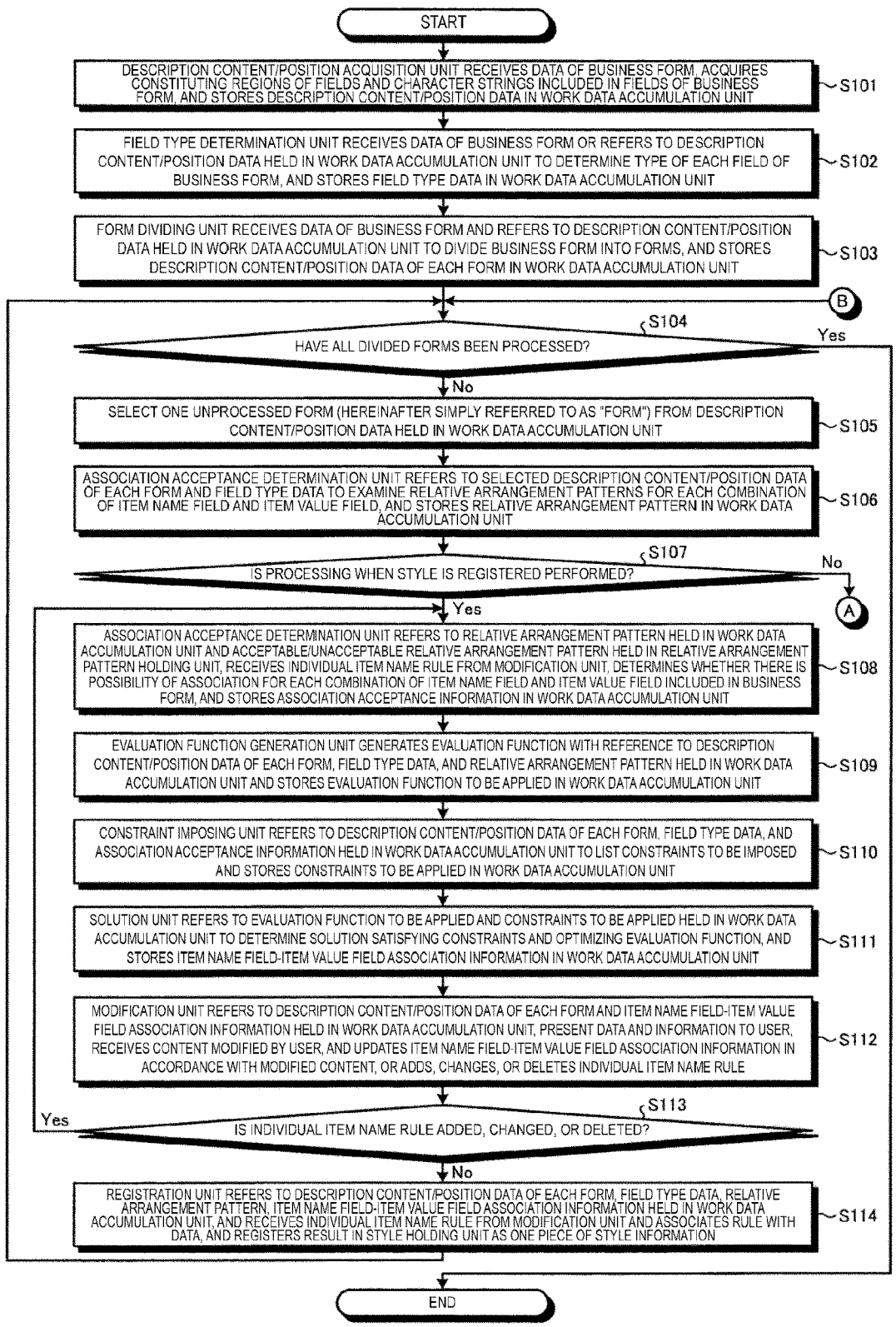
FIG. 21($a$) is a flowchart illustrating an example of an overall process of the information processing apparatus according to the first embodiment.
Figure 21B:
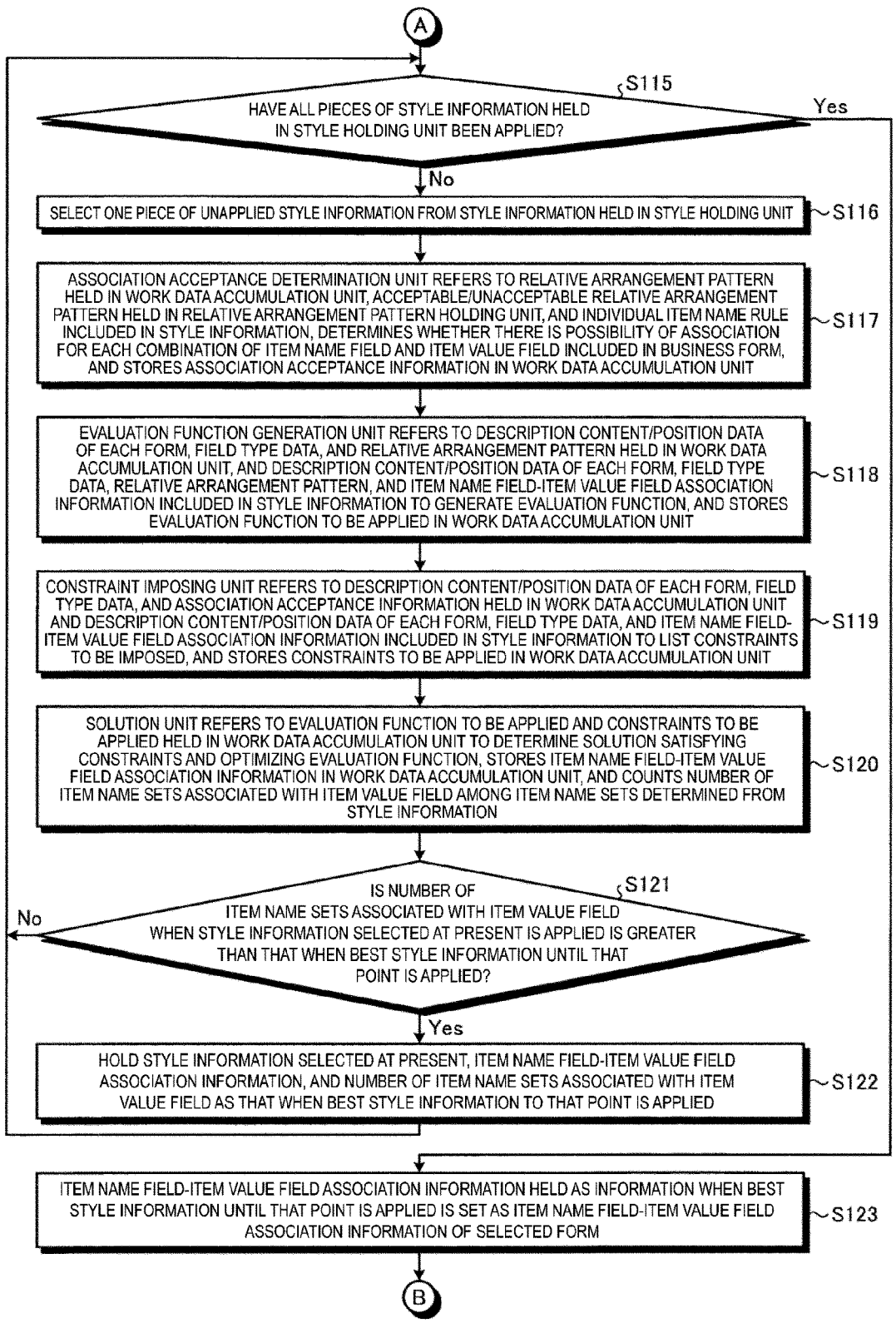

Processing Procedure of Information Processing Apparatus Next, an example of the processing procedure of the information processing apparatus 10 according to the first embodiment will be described below using FIGS. 21(a) and 21(b). FIGS. 21(a) and 21(b) are flowcharts showing an example of an overall process of the information processing apparatus according to the first embodiment.

As shown in FIGS. 21(a) and 21(b), the description content/position acquisition unit 161 receives data of a business form, acquires constituting regions of fields and character strings included in the fields of the business form, and stores the description content/position data 170a in the work data accumulation unit 170 (step S101).

Then, the field type determination unit 162 receives the data of the business form or refers to the description content/position data 170a held in the work data accumulation unit 170 to determine the type of each field of the business form, and stores the field type data 170b in the work data accumulation unit 170 (step S102).

Next, the form dividing unit 163 receives the data of the business form and refers to the description content/position data 170a held in the work data accumulation unit 170 to divide the business form into forms, and stores the description content/position data of each form 170c in the work data accumulation unit 170 (step S103).

Then, the association acceptance determination unit 164 determines whether all of the divided forms have been processed as will be described below (step S104), and if all of the divided forms have been processed (YES in step S104), the process of the information processing apparatus 10 according to the first embodiment ends. In addition, if all of the divided forms have not been processed (NO in step S104), the association acceptance determination unit 164 selects one of unprocessed forms (hereinafter referred to simply as a "business form") from the description content/position data of each form 170c held in the work data accumulation unit 170 (step S105).

Next, the association acceptance determination unit 164 refers to the selected description content/position data of each form 170c and the field type data 170b to examine the relative arrangement pattern for each combination of an item name field with an item value field, and stores the relative arrangement pattern 170d in the work data accumulation unit 170 (step S106).

Then, if processing when a style is registered is performed (YES in step S107), the association acceptance determination unit 164 refers to the relative arrangement pattern 170d held in the work data accumulation unit 170 and the acceptable/unacceptable relative arrangement pattern 171a held in the relative arrangement pattern holding unit 171, receives the individual item name rule from the modification unit 168b, determines whether there is a possibility of an association in the combinations of the item name fields and the item value fields included in the business form, and stores the association acceptance information 170e in the work data accumulation unit 170 (step S108).

Then, the evaluation function generation unit 165 refers to the description content/position data of each form 170c, the field type data 170b, and the relative arrangement pattern 170d held in the work data accumulation unit 170, generate an evaluation function and stores the evaluation function to be applied 170f in the work data accumulation unit 170 (step S109).

Next, the constraint imposing unit 166 refers to the description content/position data of each form 170c, the field type data 170b, and the association acceptance information 170e held in the work data accumulation unit 170 to list constraints to be imposed and stores the constraints to be applied 170g in the work data accumulation unit 170 (step S110).

Then, the solution unit 167 refers to the evaluation function to be applied 170f and the constraints to be applied 170g held in the work data accumulation unit 170 to determine the solution satisfying the constraints and optimizing the evaluation function, and stores the item name field-item value field association information 170h in the work data accumulation unit 170 (step S111).

Then, the modification unit 168b refers to the description content/position data of each form 170c and the item name field-item value field association information 170h held in the work data accumulation unit 170, presents the data and information to a user, receives the content modified by the user, and updates the item name field-item value field association information 170h in accordance with the modified content, or adds, changes, or deletes the individual item name rule (step S112).

Then, if the individual item name rule is added, changed, or deleted (YES in step S113), the process of the information processing apparatus 10 according to the first embodiment returns to the process in step S108. In addition, if the individual item name rule is not added, changed, or deleted (NO in step S113), the registration unit 168a refers to the description content/position data of each form 170c, the field type data 170b, the relative arrangement pattern 170d, and the item name field-item value field association information 170h held in the work data accumulation unit 170, and receives the individual item name rule from the modification unit 168*b* and associates the rule with the data, and registers the result in the style holding unit 172 as one piece of style information (step S114).

In addition, in step S107, if processing when the style is registered is not performed (NO in step S107), the association acceptance determination unit 164 determines whether all pieces of the style information held in the style holding unit 172 have been applied (step S115).

As a result, if it is determined that all pieces of the style information held in the style holding unit 172 have not been applied (NO in step S115), the association acceptance determination unit 164 selects one piece of the non-applied style information from the style information held in the style holding unit 172 (step S116).

Then, the association acceptance determination unit 164 refers to the relative arrangement pattern 170*d* held in the work data accumulation unit 170, the acceptable/unacceptable relative arrangement pattern 171*a* held in the relative arrangement pattern holding unit 171, and the individual item name rule 172*c* included in the style information to determine whether there is a possibility of an association in the combinations of the item name fields and the item value fields included in the business form, and stores the association acceptance information 170*e* in the work data accumulation unit 170 (step S117).

Next, the evaluation function generation unit 165 refers to the description content/position data of each form 170*c*, the field type data 170*b*, and the relative arrangement pattern 170*d* held in the work data accumulation unit 170, and the description content/position data of each form 172*d*, the field type data 172*b*, the relative arrangement pattern 172*e*, and the item name field-item value field association information 172*a* included in the style information to generate an evaluation function, and stores the evaluation function to be applied 170*f* in the work data accumulation unit 170 (step S118).

Next, the constraint imposing unit 166 refers to the description content/position data of each form 170*c*, the field type data 170*b*, and the association acceptance information 170*e* held in the work data accumulation unit 170 and the description content/position data of each form 172*d*, the field type data 172*b*, and the item name field-item value field association information 172*a* included in the style information to list constraints to be imposed, and stores the constraints to be applied in the work data accumulation unit 170 (step S119).

Then, the solution unit 167 refers to the evaluation function to be applied 170*f* and the constraints to be applied 170*g* held in the work data accumulation unit 170 to determine the solution satisfying the constraints and optimizing the evaluation function, and stores the item name field-item value field association information in the work data accumulation unit 170. In addition, the solution unit 167 counts the number of item name sets associated with the item value field among item name sets determined from the style information (step S120).

Then, if the number of item name sets associated with the item value field when the style information selected at present is applied is not greater than that when the best style information until that point is applied (NO in step S121), the process of the information processing apparatus 10 according to the first embodiment returns to the process of step S115. In addition, if the number of item name sets associated with the item value field when the style information selected at present is applied is greater than that when the best style information until that point is applied (YES in step S121), the information processing apparatus 10 according to the first embodiment holds the style information selected at present, the item name field-item value field association information, and the number of item name sets associated with the item value field as those when the best style information until that point is applied (step S122), and the process of the information processing apparatus 10 according to the first embodiment returns to the process of step S115.

In addition, in step S115, if it is determined that all pieces of the style information held in the style holding unit 172 have been applied (YES in step S115), the information processing apparatus 10 according to the first embodiment has the item name field-item value field association information held as information when the best style information until that point is applied as the item name field-item value field association information of a selected form (step S123), and the process of the information processing apparatus 10 according to the first embodiment returns to step S104.

Figure 22:
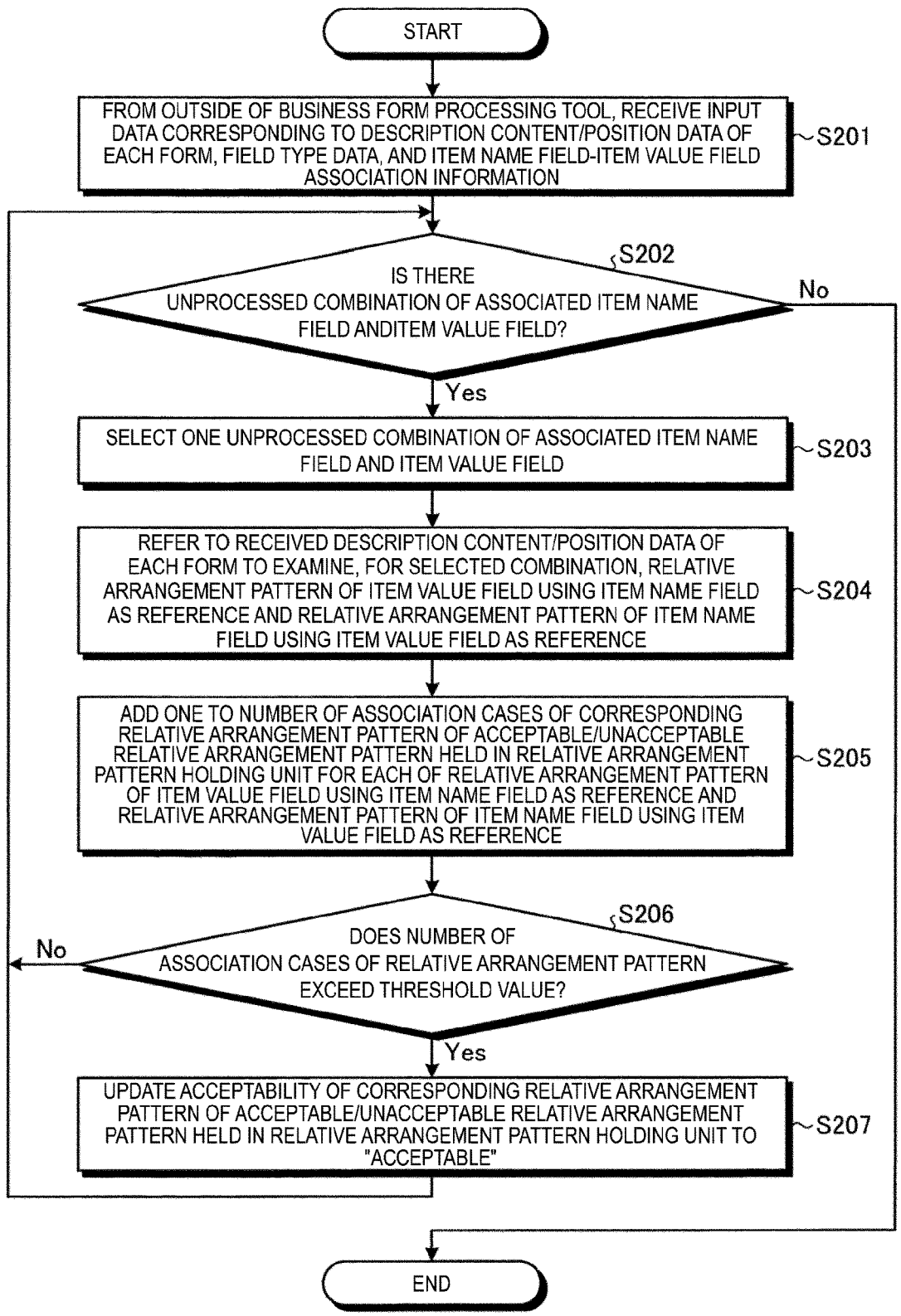
FIG. 22 is a flowchart illustrating an example of a process of an acceptable relative arrangement pattern generation unit of the information processing apparatus according to the first embodiment.

Next, an example of a processing procedure during registration of an acceptable/unacceptable relative arrangement pattern of the information processing apparatus 10 according to the first embodiment will be described using FIG. 22. FIG. 22 is a flowchart illustrating an example of a process of an acceptable relative arrangement pattern generation unit of the information processing apparatus 10 according to the first embodiment.

As illustrated in FIG. 22, the acceptable relative arrangement pattern generation unit 169 receives, from the outside of the business form processing tool, the input data corresponding to the description content/position data of each form, the field type data, and the item name field-item value field association information (step S201). Then, if the acceptable relative arrangement pattern generation unit 169 determines whether there is an unprocessed combination of associated item name field and item value field (step S202), the process ends if it is determined that there is no such a combination (NO in step S202).

In addition, if the acceptable relative arrangement pattern generation unit 169 determines that there is an unprocessed combination of associated item name field and item value field (YES in step S202), one unprocessed combination of associated item name field and item value field is selected (step S203). Then, the acceptable relative arrangement pattern generation unit 169 refers to the received description content/position data of each form to examine a relative arrangement pattern of the item value field using the item name field as a reference and a relative arrangement pattern of the item name field using the item value field as a reference for the selected combination (step S204).

Next, the acceptable relative arrangement pattern generation unit 169 adds one to the number of association cases of a corresponding relative arrangement pattern of the acceptable/unacceptable relative arrangement pattern 171*a* held in the relative arrangement pattern holding unit 171 for each of the relative arrangement pattern of the item value field using the item name field as a reference and relative arrangement pattern of the item name field using the item value field as a reference (step S205).

Then, if the acceptable relative arrangement pattern generation unit 169 determines whether the number of association cases of the relative arrangement patterns exceeds a threshold value (step S206) and determines that the number of association cases of the relative arrangement patterns does not exceed the threshold value (NO in step S206), the process returns to step S202.

In addition, if the acceptable relative arrangement pattern generation unit 169 determines that the number of association cases of the relative arrangement patterns exceeds the threshold value (YES in step S206), acceptability of the corresponding relative arrangement pattern of the acceptable/unacceptable relative arrangement pattern 171a held in the relative arrangement pattern holding unit 171 is updated to "acceptable" (step S207), the process returns to step S202.

Figure 23:
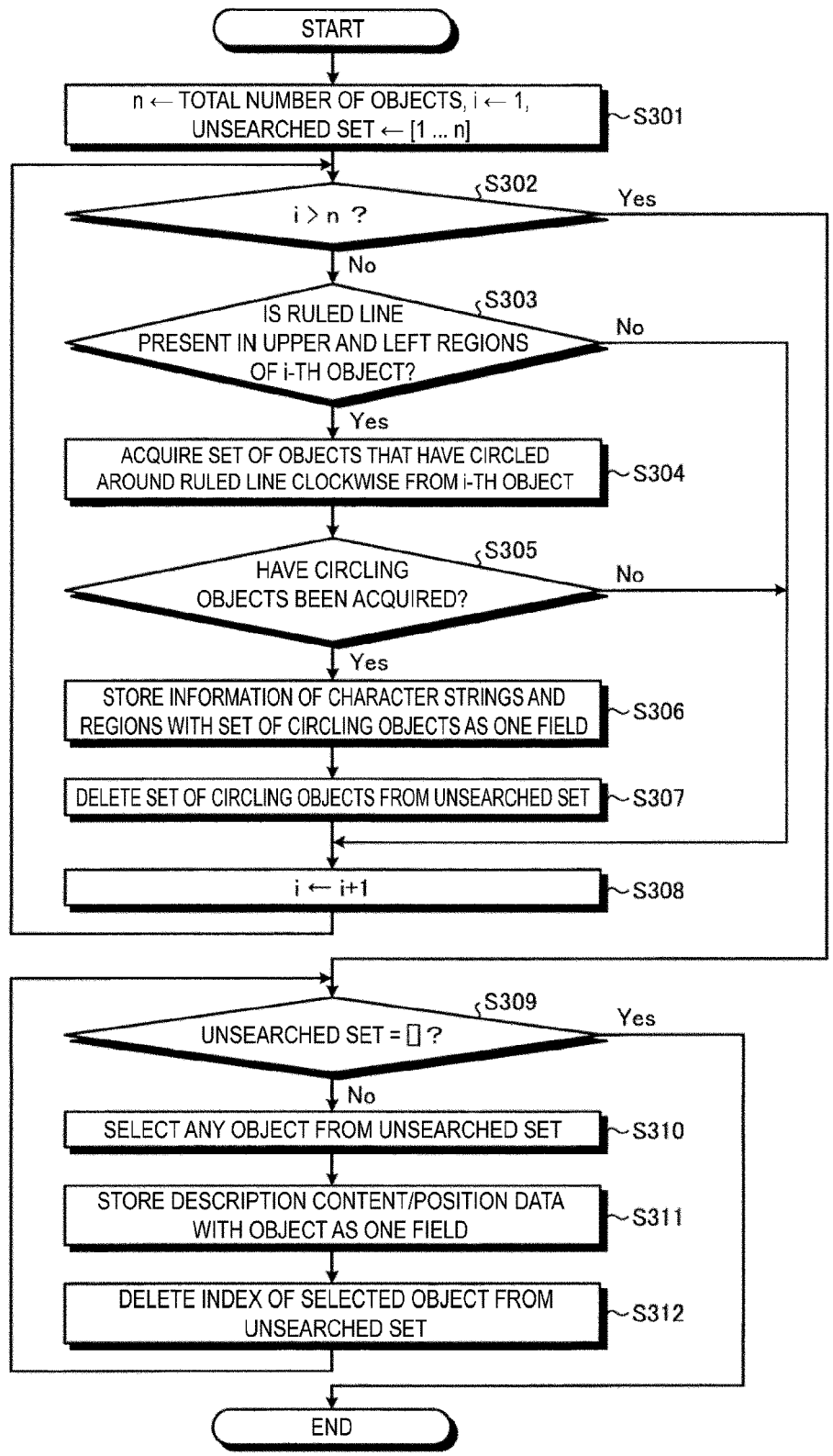
FIG. 23 is a flowchart illustrating an example of a process of a description content/position acquisition unit of the information processing apparatus according to the first embodiment.
Figure 24:
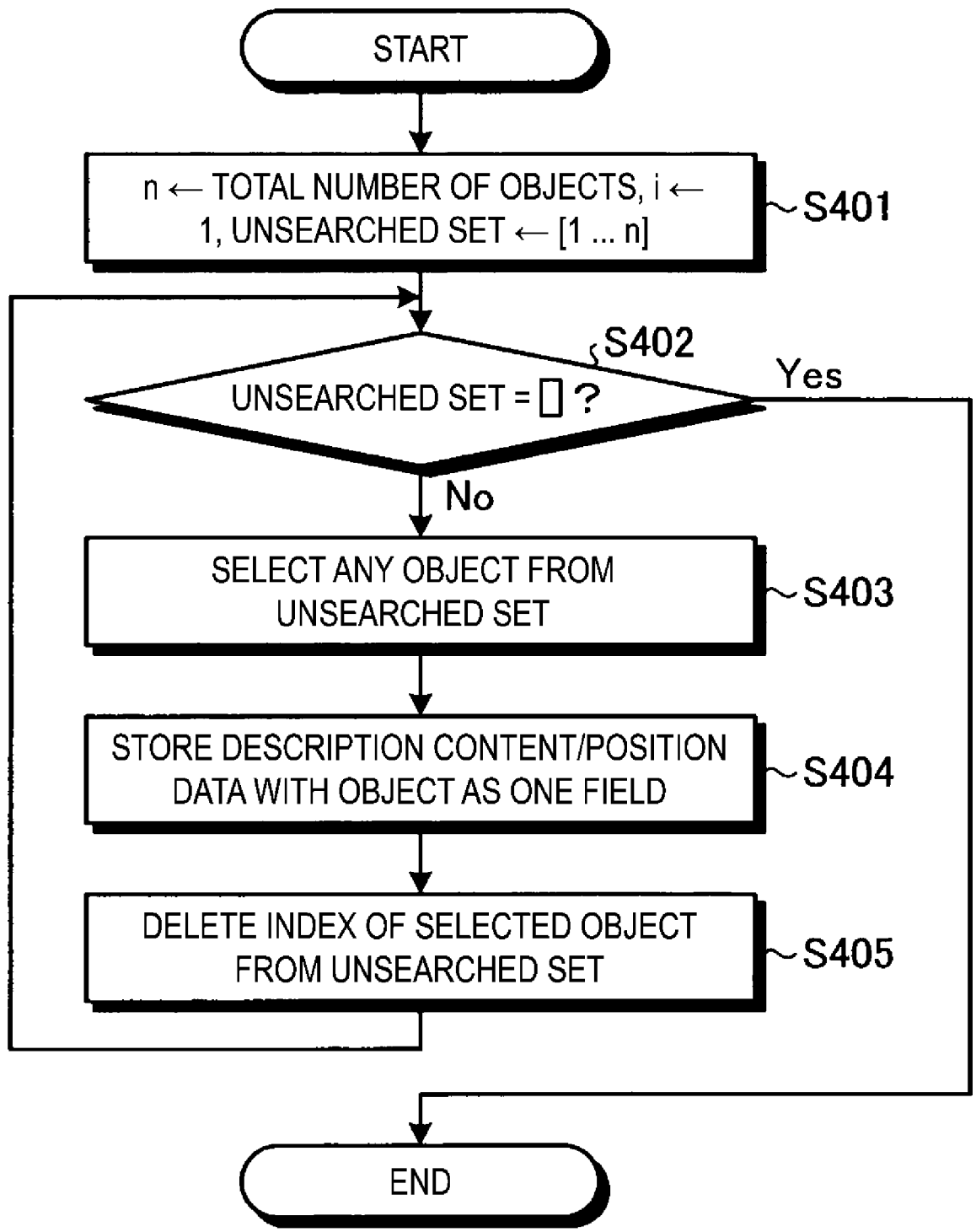
FIG. 24 is a flowchart illustrating an example of a process of the description content/position acquisition unit of the information processing apparatus according to the first embodiment.
Figure 25:
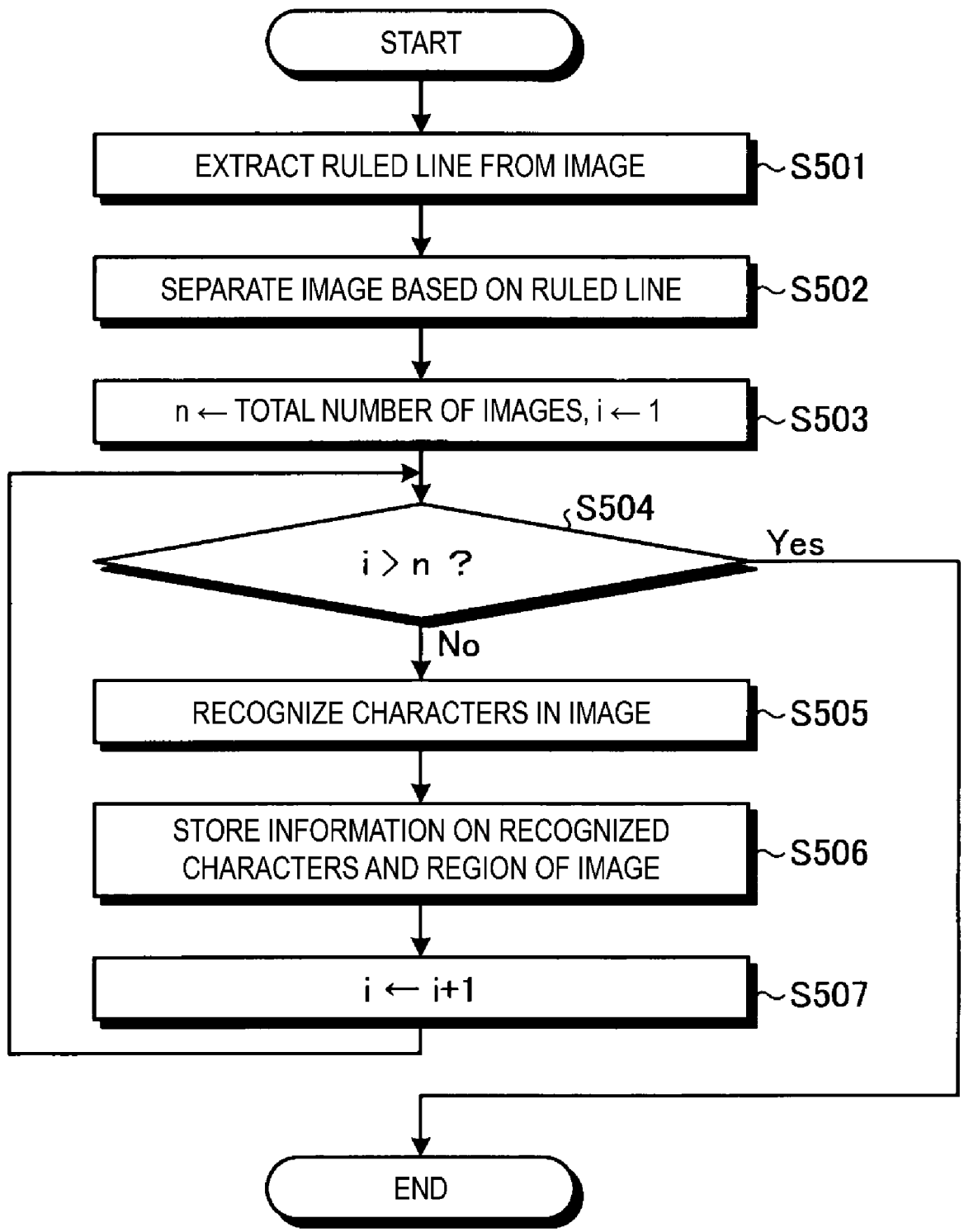
FIG. 25 is a flowchart illustrating an example of a process of the description content/position acquisition unit of the information processing apparatus according to the first embodiment.

Next, an example of the processing procedure of the description content/position acquisition unit 161 of the information processing apparatus 10 according to the first embodiment will be described below using FIGS. 23 to 25. FIGS. 23 to 25 are flowcharts illustrating an example of a process of a description content/position acquisition unit of the information processing apparatus according to the first embodiment.

First, a process of the description content/position acquisition unit 161 in the case in which fields of a business form are surrounded by ruled lines will be described using FIG. 23. As shown in FIG. 23, the description content/position acquisition unit 161 sets a total number of objects to n, sets a value of i to "1," and sets an unsearched set to [1, . . . , and n] (step S301). Then, the description content/position acquisition unit 161 determines whether the value of i is greater than the value of n (step S302).

As a result, if the value of i is not greater than the value of n (NO in step S302), the description content/position acquisition unit 161 determines whether there is a ruled line in the upper and left regions of an i-th object (step S303). As a result, if there is no ruled line in the upper and left regions of the i-th object (NO in step S303), the description content/position acquisition unit 161 proceeds to the process of step S308. In addition, if there is a ruled line in the upper and left regions of the i-th object (YES in step S303), the description content/position acquisition unit 161 acquires a set of objects that have circled around the ruled line clockwise from the i-th object (step S304).

Then, the description content/position acquisition unit 161 determines whether the circling objects have been acquired (step S305). As a result, if the circling objects have not been acquired (NO in step S305), the description content/position acquisition unit 161 proceeds to the process of step S308. In addition, if the circling objects has been acquired (YES in step S305), the description content/position acquisition unit 161 stores the information of character strings and the regions as the description content/position data 170a in the work data accumulation unit 170, with the set of circling objects as one field (step S306).

Next, the description content/position acquisition unit 161 deletes the set of the circling objects from the unsearched set (step S307), adds "1" to the value of i (step S308), and returns to the process of step S302.

In step S302, if the value of i is greater than the value of n (YES in step S302), the description content/position acquisition unit 161 determines whether there is no object in the unsearched set (step S309), and if there is an object in the unsearched set (NO in step S309), any object is selected from the unsearched set (step S310).

Then, the description content/position acquisition unit 161 stores the description content/position data 170a in the work data accumulation unit 170 with the object as one field (step S311), deletes the index of the selected object from the unsearched set (step S312), and returns to the process of step S309. In addition, if there is no object in the unsearched set (YES in step S309), the description content/position acquisition unit 161 ends the process.

Next, a process of the description content/position acquisition unit 161 in the case in which fields of a business form are not surrounded by ruled lines will be described using FIG. 24. As shown in FIG. 24, the description content/position acquisition unit 161 sets a total number of objects to n, sets a value of i to "1," and sets an unsearched set to [1, . . . , and n] (step S401). Then, the description content/position acquisition unit 161 determines whether there is no object in the unsearched set (step S402), and if there is an object in the unsearched set (NO in step S402), any object is selected from the unsearched set (step S403).

Then, the description content/position acquisition unit 161 stores the description content/position data 170a in the work data accumulation unit 170 with the object as one field (step S404), deletes the index of the selected object from the unsearched set (step S405), and returns to the process of step S402. In addition, if there is no object in the unsearched set (YES in step S402), the description content/position acquisition unit 161 ends the process.

Next, a process of the description content/position acquisition unit 161 when a business form is image data will be described using FIG. 25. The description content/position acquisition unit 161 extracts ruled lines from an image (step S501) to separate the image from the ruled lines (step S502). Then, the description content/position acquisition unit 161 sets the total number of images to n and the value of i to "1" (step S503).

Then, the description content/position acquisition unit 161 determines whether the value of i is greater than the value of n (step S504). As a result, if the value of i is not greater than the value of n (NO in step S504), the description content/position acquisition unit 161 recognizes characters in the image (step S505), and stores information on the recognized characters and regions of the image in the work data accumulation unit 170 as the description content/position data 170a (step S506).

Next, the description content/position acquisition unit 161 adds "1" to the value of i (step S507) and returns to the process of step S504. In addition, in step S504, if it is determined that the value of i is greater than the value of n (YES in step S504), the description content/position acquisition unit 161 ends the process.

Effects of First Embodiment As described above, the information processing apparatus 10 according to the first embodiment registers the style information, and when the registered style information is used, identifies an association of an item name field with an item value field included in a business form to be processed based on a set of item names determined from the registered style information. Thus, even if there is a change in the arrangement of fields of the business form, the information processing apparatus 10 can identify an association of an item name field with an item value field included in the business form.

Further, the information processing apparatus 10 according to the first embodiment determines whether there is a possibility of association of an item name field with an item value field using a distribution pattern of regions in which another field is present (relative arrangement pattern) with reference to a field regardless of the shape of the field or whether fields are adjacent to each other. Thus, in the information processing apparatus 10, it is possible to associate an item name field and an item value field even if a business form that does not satisfy the conditions relating to the shapes of the item name field or the item value field or their arrangement patterns, which are assumed in the related art.

For example, in the related art, whether there is an association of each item value field only with an item name field adjacent thereto is determined, the master-slave relationship between item name fields is determined from the arrangement of two item name fields, and further the presence or absence of an association is indirectly determined by combining the determination results. Thus, in the related art, there is a case in which an association of an item value field with an item name field that is not adjacent thereto is inappropriate. In contrast, the information processing apparatus 10 according to the first embodiment determines whether there is a possibility of an association of any combination of an item name field and an item value field. As a result, the information processing apparatus 10 is able to eliminate an inappropriate association of an item value field with an item name field that is not adjacent thereto.

In addition, the information processing apparatus 10 according to the first embodiment imposes a constraint in which each item value field is associated with any item name field among combinations having a possibility of association when a style is registered. In this way, the information processing apparatus 10 can determine the association of the item name field with the item value so that no item value field not being associated with any item name field remains and the item name fields are associated with all of the item value fields when a style is registered.

In addition, the information processing apparatus 10 according to the first embodiment is designed to specify an acceptable relative arrangement pattern for each item name, determine whether there is a possibility of an association of an item name field with an item value field, and search for a solution with other constraints. In this way, the information processing apparatus 10 can appropriately determine the association of the item name field with the item value even though the acceptable/unacceptable relative arrangement pattern is of the item different from a generic item.

Further, even if the business form to be processed when the registered style information is used includes items not present when the style is registered, the information processing apparatus 10 according to the first embodiment can determine the association of the item name field with the item value for all items that are present in the business when the style is registered without registering the style again.

In addition, the information processing apparatus 10 according to the first embodiment can identify the position of the item value field even in a case in which, for example, vertical and horizontal rows are swapped when item names are arranged in both vertical and horizontal directions, or order of the master-slave relationships between item names is changed in a business form when the style is registered and the business form to be processed when the registered style information is used.

System Configuration, etc.

Further, the respective components of the devices, which have been illustrated, are functional and conceptual ones, and are not necessarily physically configured as illustrated. That is, a specific form of distribution and integration of the respective devices is not limited to the illustrated one, and all or a portion thereof can be configured to be functionally or physically distributed and integrated in any units, according to various loads, use situations, and the like. Further, all or some of processing functions performed by the devices may be realized by a CPU and a program that is analyzed and executed by the CPU, or may be realized as hardware based on wired logic.

Further, all or some of the processes in the present embodiment described as being automatically performed can also be manually performed, or all or some of the processes described as being manually performed can also be automatically performed in a known method. In addition, information including the processing procedures, control procedures, specific names, and various types of data or parameters illustrated in the aforementioned literatures or drawings can be arbitrarily changed unless otherwise specified.

Program

In addition, a program in which the processes executed by the information processing apparatus described in the above-described embodiment is described in a computer-executable language can also be created. It is also possible to create an association program in which a process executed by the information processing apparatus 10 according to the embodiment is described in a computer-executable language. In this case, when a computer executes the association program, the same effects as those of the above-described embodiment can be exhibited. Furthermore, similar processes to those of the above-described embodiment may be implemented by recording such an association program in a computer-readable recording medium, causing a computer to read the association program recorded in the recording medium, and executing the program.

Figure 26:
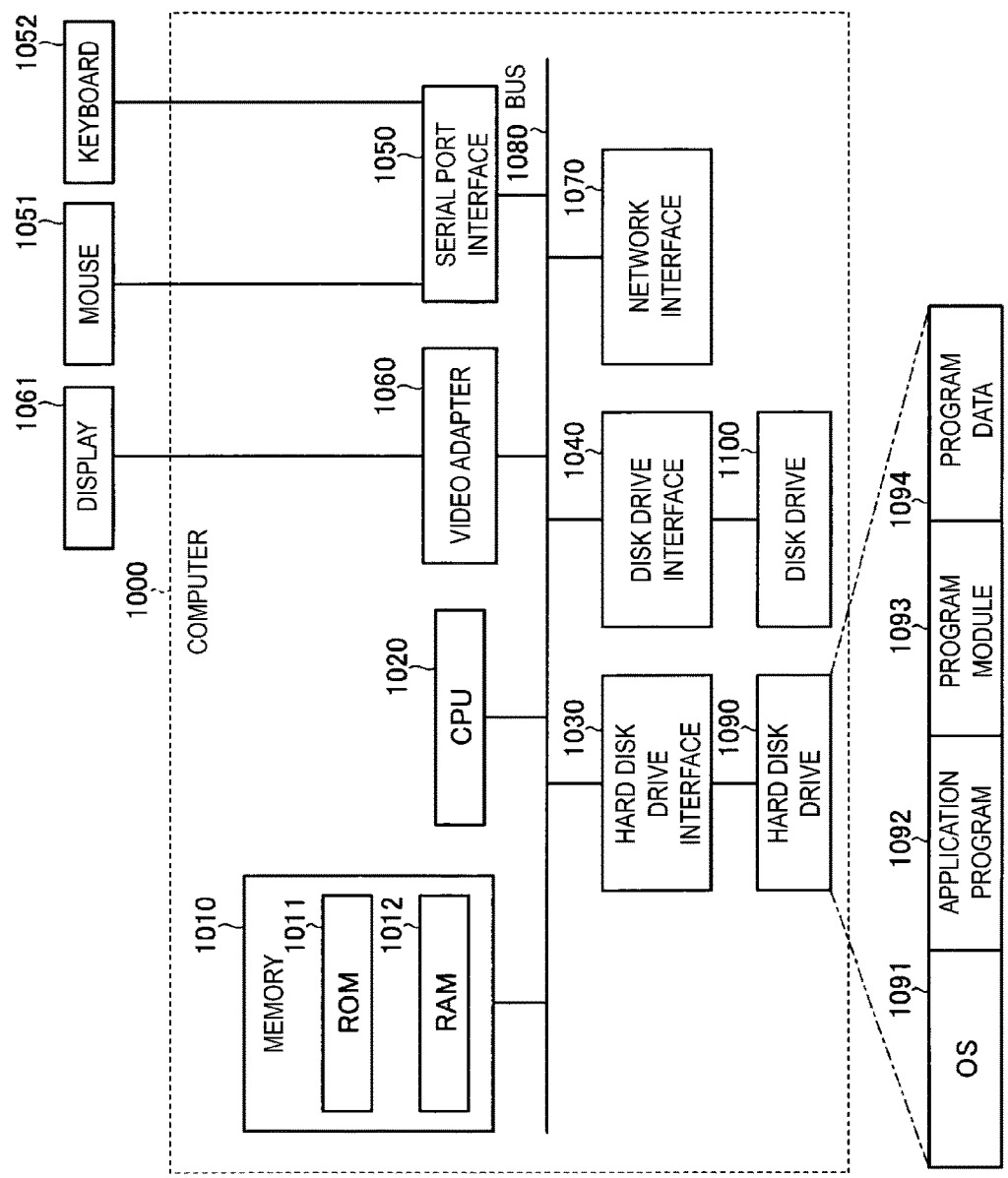
FIG. 26 is a diagram illustrating a computer that executes a specific program.

FIG. 26 is a diagram illustrating a computer that executes an association program. As illustrated in FIG. 26, a computer 1000 includes, for example, a memory 1010, a CPU 1020, a hard disk drive interface 1030, a disk drive interface 1040, a serial port interface 1050, a video adapter 1060, and a network interface 1070, which are connected by a bus 1080.

The memory 1010 includes a read only memory (ROM) 1011 and a RAM 1012 as illustrated in FIG. 26. The ROM 1011 stores, for example, a boot program such as a basic input output system (BIOS). The hard disk drive interface 1030 is connected to a hard disk drive 1090 as illustrated in FIG. 26. The disk drive interface 1040 is connected to a disk drive 1100 as illustrated in FIG. 26. A detachable storage medium such as a magnetic disk or an optical disc, for example, is inserted into the disk drive 1100. The serial port interface 1050 is connected to, for example, a mouse 1110 and a keyboard 1120 as illustrated in FIG. 26. The video adapter 1060 is connected to a display 1130, for example, as illustrated in FIG. 26.

Here, the hard disk drive 1090 stores, for example, an OS 1091, an application program 1092, a program module 1093, and program data 1094 as illustrated in FIG. 26. In other words, the above-described association program is stored in the hard disk drive 1090 as the program module in which instructions to be executed by the computer 1000 are described, for example.

Further, the various types of data described in the embodiment are stored as the program data in, for example, the memory 1010 or the hard disk drive 1090. In addition, the CPU 1020 reads the program module 1093 or the program data 1094 stored in the memory 1010 or the hard disk drive 1090 into the RAM 1012 as necessary, and executes various processing procedures.

Note that the program module 1093 and the program data 1094 for the association program are not necessarily stored in the hard disk drive 1090, and may be stored in, for example, a removable storage medium to be read by the CPU 1020 via the disk drive or the like. Alternatively, the program module 1093 and the program data 1094 for the association program may be stored in another computer connected via a network such as a local area network (LAN) or wide area network (WAN) and may be read by the CPU 1020 through the network interface 1070.

REFERENCE SIGNS LIST

10 Information processing apparatus
11a Operation input unit

11b Business form input unit
12 Display unit
13 OS
14 Storage unit
15 Editor
16 Business form processing tool
161 Description content/position acquisition unit
162 Field type determination unit
163 Form dividing unit
164 Association acceptance determination unit
165 Evaluation function generation unit
166 Constraint imposing unit
167 Solution unit
168a Registration unit
168b Modification unit
169 Acceptable relative arrangement pattern generation unit
170 Work data accumulation unit
170a Description content/position data
170b, 172b Field type data
170c, 172d Description content/position data of each form
170d, 172e Relative arrangement pattern
170e Association acceptance information
170f Evaluation function to be applied
170g Constraints to be applied
170h, 172a Item name field-item value field association information
171 Relative arrangement pattern holding unit
171a Acceptable/unacceptable relative arrangement pattern
172 Style holding unit
172c Rule of each item name

The invention claimed is:

1. An information processing apparatus comprising:
processing circuitry configured to:
register a set of item names corresponding to an item name field associated with an item value field in a predetermined business form;
determine, for each combination of the item name field and the item value field in the predetermined business form to be processed, a first relative arrangement pattern and a second relative arrangement pattern;
compare each relative arrangement pattern to any one or both of a preset acceptable relative arrangement pattern and a preset unacceptable relative arrangement pattern;
determine a possibility of an association of the item name field with the item value field if both of the first relative arrangement pattern and the second relative arrangement pattern are acceptable for the combination, and determine that there is no possibility of an association of the item name field with the item value field if not; and
identify an association of an item name field with an item value field included in a business form to be processed based on the set of item names registered among combinations having the possibility of the association.

2. The information processing apparatus according to claim 1,
wherein the processing circuitry is further configured to:
impose, in a case in which the item name field and the item value field included in the business form to be processed are distinguishable, a constraint that the item name field and the item value field are associated only in a case in which the association is acceptable from a perspective of a relative arrangement relationship of fields, a constraint that each item value field is associated with at least one item name field, a constraint that, in a case in which there are a plurality of item name fields with an identical character string, a maximum number of the item name fields associated with an identical item value field is one, and a constraint that item value fields have different sets of item names described in item name fields associated with the item value fields, and
identify an association of the item name field with the item value field included in the business form to be processed such that constraints imposed are satisfied.

3. The information processing apparatus according to claim 1,
wherein the processing circuitry is further configured to:
generate, in a case in which style information of a business form for which an association of an item value field with an item name field has been identified in advance is used to process another business form, a set of item name fields included in the business form to be processed for each set of item names held in registered style information and to impose a constraint that the item name field and the item value field are associated only in a case in which the association is acceptable from a perspective of a relative arrangement relationship of fields, a constraint that each item value field is associated with up to one set of item name fields, a constraint that each set of item name fields is associated with up to one item value field, and a constraint that a maximum number of sets of item name fields that are generated for an identical set of item names and that are associated with an item value field is one, and
identify an association of the item value field with the set of item name fields included in the business form to be processed and an association of the item name field with the item value field such that constraints imposed are satisfied.

4. The information processing apparatus according to claim 1, wherein, in a case in which an individual item name rule defining any one or both of the preset acceptable distribution pattern and unacceptable distribution pattern for each item name is set, the processing circuitry is further configured to determine a possibility of an association of the item name field with the item value field included in the business form to be processed according to the individual item name rule.

5. The information processing apparatus according to claim 1, wherein the processing circuitry is further configured to acquire a relative arrangement pattern from an association of an item name field with an item value field included in a business form with a predetermined style to create data of an acceptable arrangement pattern based on the acquired relative arrangement pattern.

6. An association method executed by an information processing apparatus, the association method comprising:
registering a set of item names corresponding to an item name field associated with an item value field in a predetermined business form;
determining, for each combination of the item name field and the item value field in the predetermined business form to be processed, a first relative arrangement pattern and a second relative arrangement pattern;
comparing each relative arrangement pattern to any one or both of a preset acceptable relative arrangement pattern and a preset unacceptable relative arrangement pattern;

determining a possibility of an association of the item name field with the item value field if both of the first relative arrangement pattern and the second relative arrangement pattern are acceptable for the combination, and determining that there is no possibility of an association of the item name field with the item value field if not; and identifying an association of an item name field with an item value field included in a business form to be processed based on the set of item names registered in the registering among combinations having the possibility of the association.

7. A non-transitory computer-readable recording medium storing therein an association program that causes a computer to execute a process comprising:

registering a set of item names corresponding to an item name field associated with an item value field in a predetermined business form;

determining, for each combination of the item name field and the item value field in the predetermined business form to be processed, a first relative arrangement pattern and a second relative arrangement pattern;

comparing each relative arrangement pattern to any one or both of a preset acceptable relative arrangement pattern and a preset unacceptable relative arrangement pattern;

determining a possibility of an association of the item name field with the item value field if both of the first relative arrangement pattern and the second relative arrangement pattern are acceptable for the combination, and determining that there is no possibility of an association of the item name field with the item value field if not; and identifying an association of an item name field with an item value field included in a business form to be processed based on the set of item names registered in the registering among combinations having the possibility of the association.

* * * * *